US012780165B2

(12) United States Patent
McCleish et al.

(10) Patent No.: US 12,780,165 B2
(45) Date of Patent: Nov. 3, 2026

(54) BRAKE SYSTEM CONTROL FOR AUTONOMOUS OPERATION

(71) Applicant: Deere & Company, Moline, IL (US)

(72) Inventors: Ryan G. McCleish, Cedar Falls, IA (US); Aaron M. Quinn, Cedar Falls, IA (US); Andrew P. Beougher, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 446 days.

(21) Appl. No.: 18/497,619

(22) Filed: Oct. 30, 2023

(65) Prior Publication Data

US 2024/0286593 A1 Aug. 29, 2024

Related U.S. Application Data

(60) Provisional application No. 63/448,729, filed on Feb. 28, 2023.

(51) Int. Cl.
*B60T 13/68* (2006.01)
*B60T 17/22* (2006.01)

(52) U.S. Cl.
CPC ............ *B60T 13/686* (2013.01); *B60T 17/22* (2013.01); *B60T 2270/306* (2013.01)

(58) Field of Classification Search
None
See application file for complete search history.

(56) References Cited

U.S. PATENT DOCUMENTS 3,708,030 A 1/1973 Ueda et al.
10,040,436 B2 8/2018 Schick et al.
10,166,956 B2 1/2019 Schick et al.
10,173,652 B2 1/2019 Schick et al.
10,661,766 B2 5/2020 Schick et al.
2019/0344767 A1* 11/2019 Bareiss ..................... B60T 7/12
(Continued)

FOREIGN PATENT DOCUMENTS

CN 102588474 A 7/2012
DE 102023108135 A1 2/2024
(Continued)

OTHER PUBLICATIONS

GB-2608852-A: English Machine Translation (Year: 2023).*
(Continued)

*Primary Examiner* — Melanie Torres Williams
(74) *Attorney, Agent, or Firm* — Tucker Ellis LLP

(57) ABSTRACT

One or more techniques and/or systems are disclosed for providing autonomous braking with a brake system that includes a method that receives a command for application of a brake pressure and controlling a primary valve set, via an electronic control unit (ECU), to a first defined pressure to apply a braking power in response to the received command. The method further includes controlling a secondary valve set, via the ECU, to a second defined pressure in response to the received command, wherein the second defined pressure is less than the first defined pressure. The method also includes controlling the secondary valve set, via the ECU, to the first defined pressure in response to a determination that the braking power applied by the primary valve set is below a low command threshold, wherein the low command threshold is less than the first defined pressure.

20 Claims, 21 Drawing Sheets

(56) References Cited

U.S. PATENT DOCUMENTS

| | | | | |
|---|---|---|---|---|
| 2022/0234552 | A1* | 7/2022 | Miranda | B60T 13/745 |
| 2022/0332302 | A1 | 10/2022 | Watanabe et al. | |
| 2024/0092327 | A1 | 3/2024 | Mccleish et al. | |

FOREIGN PATENT DOCUMENTS

| | | | | | |
|---|---|---|---|---|---|
| FR | 3073478 | A1 | * | 5/2019 | B60T 17/221 |
| GB | 2608852 | A | * | 1/2023 | B60T 17/06 |

OTHER PUBLICATIONS

FR-3073478-A1: English Machine Translation (Year: 2019).*

German Search Report issued in application No. 102023135748.4 dated Oct. 30, 2024, 12 pages.

* cited by examiner

BRAKE SYSTEM CONTROL FOR AUTONOMOUS OPERATION

CROSS-REFERENCE TO RELATED APPLICATION

This application claims priority to provisional application U.S. Ser. No. 63/448,729, titled BRAKE SYSTEM CONTROL FOR AUTONOMOUS OPERATION, filed Feb. 28, 2023, which is incorporated herein by reference.

BACKGROUND

Vehicles, such as tractors, are being designed to operate autonomously. While operating autonomously, the braking function is still needed, for example, to control vehicle train speed, slow the vehicle train, bring the vehicle to a complete stop (as needed) in the work cycle, or when an object is detected near the tractor and/or connected implement. Current tractor service and backup brake architectures are designed to be actuated by an operator sitting in the operator station of the tractor (e.g., cab of the tractor). The operator can apply the brakes in the cab using foot or hand forces to actuate a pedal or lever.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Current brake systems do not provide for autonomous operation to stop the vehicle (e.g., tractor), such as during normal operation or during a brake failure event. One or more techniques and systems are described herein for autonomous braking, such as autonomous braking of a tractor. For example, an autonomous brake system actuates tractor brakes autonomously, and in the event of a single point failure, provides a backup to actuate the brakes.

In one implementation for providing autonomous braking, a method includes receiving a command for application of a brake pressure and controlling a primary valve set, via an electronic control unit (ECU), to a first defined pressure to apply a braking power in response to the received command. The method further includes controlling a secondary valve set, via the ECU, to a second defined pressure in response to the received command, wherein the second defined pressure is less than the first defined pressure. The method also includes controlling the secondary valve set, via the ECU, to the first defined pressure in response to a determination that the braking power applied by the primary valve set is below a low command threshold, wherein the low command threshold is less than the first defined pressure.

In another implementation, one or more computer storage media have computer-executable instructions for controlling autonomous braking that, upon execution by a processor, cause the processor to at least receive a command for application of a brake pressure, control a primary valve set to a first defined pressure to apply a braking power in response to the received command, and control a secondary valve set to a second defined pressure in response to the received command, wherein the second defined pressure is less than the first defined pressure. The one or more computer storage media have further computer-executable that, upon execution by the processor, cause the processor to control the secondary valve set to the first defined pressure in response to a determination that the braking power applied by the primary valve set is below a low command threshold, wherein the low command threshold is less than the first defined pressure.

In yet another implementation, a method for controlling autonomous braking includes configuring a primary valve set for normal braking operation, configuring a secondary valve set for backup braking operation, and pre-staging the secondary valve set during normal braking operation. The method further includes actuating the pre-staged secondary valve set during a failure of the primary valve set and increasing a pressure of the pre-staged secondary valve to a pressure for normal braking operation to be applied to one or more brakes in response to the failure of the primary valve set.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The examples disclosed herein may take physical form in certain parts and arrangement of parts, and will be described in detail in this specification and illustrated in the accompanying drawings which form a part hereof and wherein.

DETAILED DESCRIPTION

Figure 1:
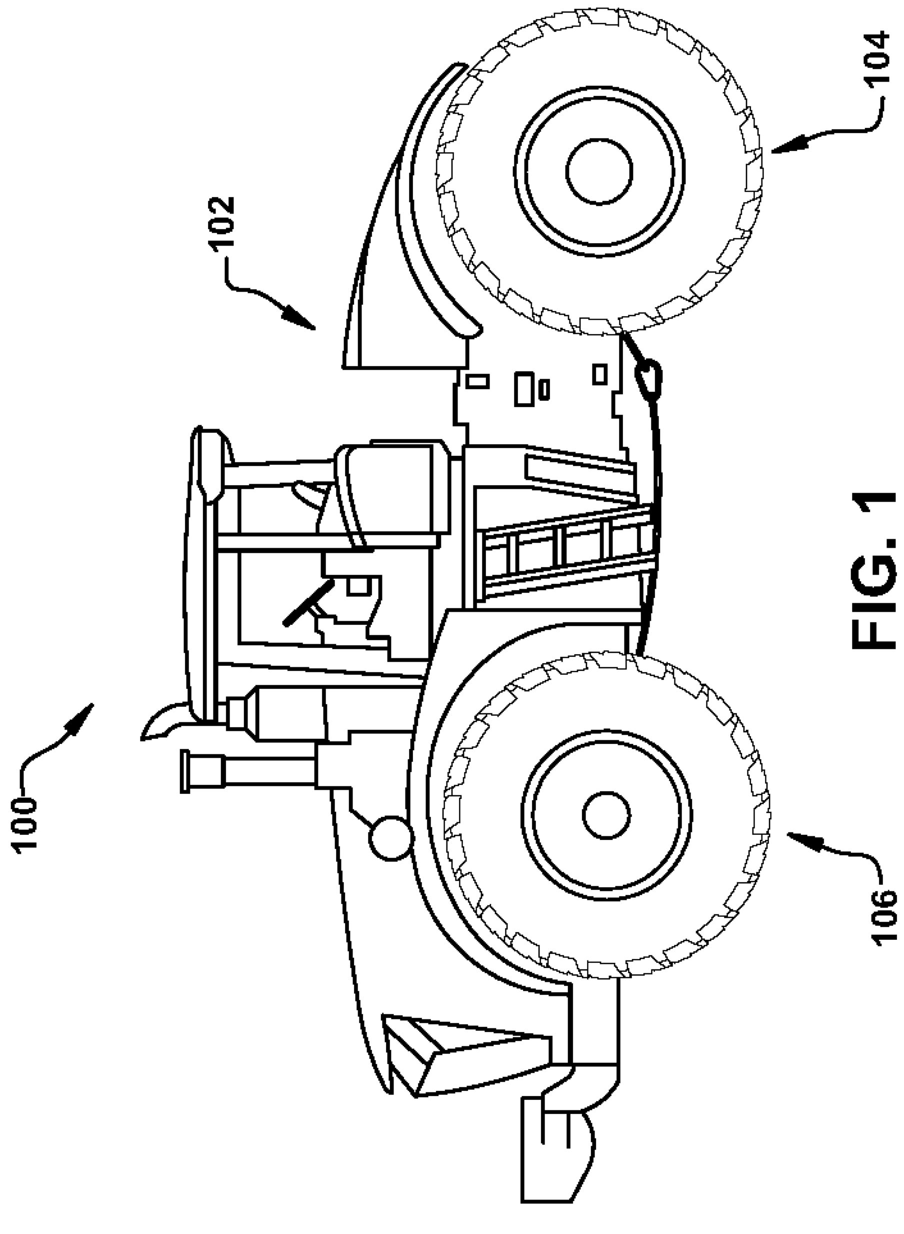
FIG. 1 is a component diagram illustrating an example implementation of a vehicle in which various examples can be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The methods and systems disclosed herein, for example, may be suitable for use in different braking applications, such as for different autonomous and semi-autonomous applications and in different vehicles. That is, the herein disclosed examples can be implemented in combination with different braking systems other than for particular vehicles, such as other than for farm vehicles (e.g., tractors). For example, one or more systems and methods for controlling braking operations can be used in different types of vehicles having different braking systems.

FIG. 1 is a component diagram illustrating an example implementation of a system that may utilize one or more portions of the aspects and examples described herein. In the implementation illustrated in FIG. 1, a vehicle 100, such as a tractor, can perform different operations, such as a ground working operation in a field. In some implementations, the vehicle 100 has wheels 104, 106 installed thereon. In other implementations, the vehicle 100 has track systems (not shown) instead of wheels installed on the rear or both the front and rear of the vehicle 100.

The vehicle 100 includes a chassis 102, which provides attachment points for the vehicle 100. For example, a work tool (e.g., a bucket, fork, blade, auger, or hammer) can be connected to the front or back of the chassis 102. The work tool is movably connected to the chassis 102 in some examples.

The vehicle 100 further includes a brake system as described in more detail herein. For example, the brake system is configured to autonomously apply the brakes and slow or stop the vehicle 100, such as to apply brake force(s) to control vehicle train speed, slow the vehicle train, bring the vehicle 100 to a complete stop in the work cycle, or when an object is detected near the tractor and implement. In one or more examples, a set of multiple electronic brake system valves (e.g., a primary brake valve set and a secondary brake valve set) on a tractor are controlled to provide redundancy allowing for rapid braking response even when there is a primary brake failure or issue. In one particular implementation, the system reduces or minimizes the delay time for operation of the secondary brake valve set by having pressure already partially applied to the secondary brake valve set. In this way, the system reduces the increase in vehicle stopping distance due to a failure in the primary brake valve set.

While various examples are described in connection with a tractor or control arrangement having a particular configuration, the systems and methods described herein may also be utilized with other types of vehicles and implements. For example, the vehicle may comprise another utility-type vehicle, such as a truck, hauler, semi-tractor, or any vehicle that uses a brake system, such as any vehicle with one or more brakes. For example, one or more herein described aspects can be implemented in a work vehicle, such as a backhoe loader, but may be any work vehicle with a brake system, such as an articulated dump truck, compact track loader, crawler (e.g., crawler dozer, crawler loader), excavator, feller buncher, forwarder, harvester, knuckleboom loader, motor grader, scraper, skidder, sprayer, skid steer, tractor, tractor loader, and wheel loader, among others. The various examples can also be implemented in other work vehicles, passenger vehicles, or other equipment having brakes.

Figure 2:
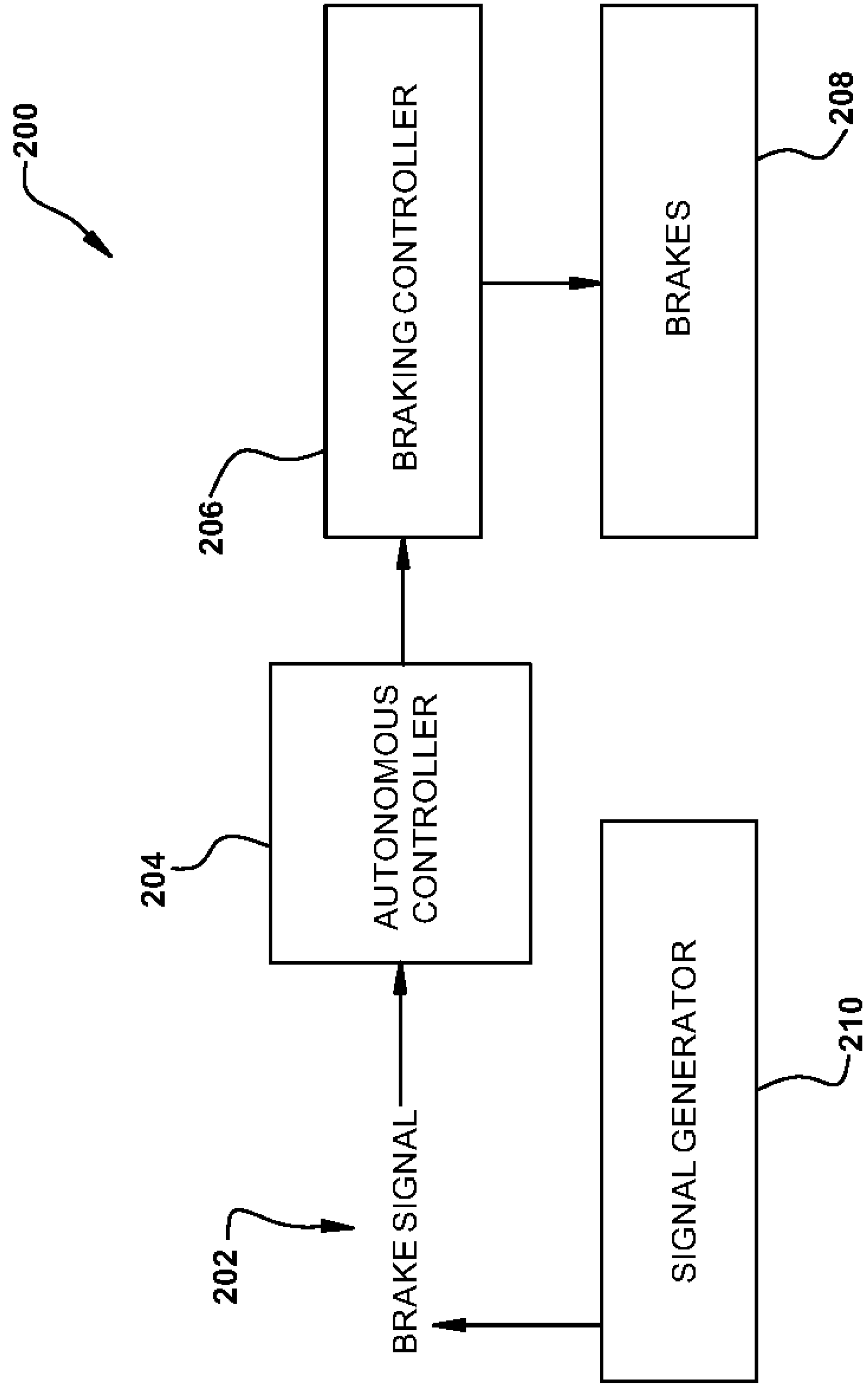
FIG. 2 is a block diagram illustrating an autonomous brake system according to one implementation.

The vehicle 100 in one example is a tractor that includes and/or operates with an autonomous brake system 200 as illustrated in FIG. 2. The autonomous brake system 200 includes an autonomous controller 204 configured to receive a brake signal (e.g., a wireless brake control signal) and transmit the received brake signal to a braking controller 206. In some examples, the autonomous controller 204 processes or pre-processes the received brake signal before transmitting the signal to the autonomous controller 204. In some examples, the autonomous controller 204 is a transmission and reception device (e.g., a transceiver) that operates to communicate between the braking controller 206 and an autonomous signal generator 210 that generates the brake signal 202. The autonomous signal generator 210 can be provided at different locations, such as at an autonomous control console located remote from the vehicle 100 (e.g., in a farm building), in the cab of the vehicle 100, etc. The autonomous signal generator 210 generates signals based on one or more user inputs (e.g., a user input at a control console or user interface) in some examples and automatically generates signals in other examples (e.g., based on feedback, to stop a vehicle when an object is detected, to switch to back-up or auxiliary braking during a detected failure event or condition).

The braking controller 206 in various examples is configured to control operation of one or more brakes 208 as described in more detail herein, including to pre-stage secondary or backup braking that provides more rapid response through redundant control of the multiple valve sets. That is, the braking controller 206 receives the signals from the autonomous controller 204 and controls operation of one or more components of the brakes 208 (or associated components) to cause a braking force to be applied to slow or stop the vehicle 100, which includes more quickly causing the braking force to be applied in the event of primary brake failure. It should be noted that in some examples, the braking controller 206 controls brake operation of the brakes 208 of the vehicle. In some examples, the braking controller 206 controls brake operation of trailer brakes in a trailer or other implement being towed by the vehicle 100. The braking controller 206 can control the brake operation of different brakes associated with different vehicles. It should also be noted that one or more components or operations of the autonomous brake system 200 can be combined or separated and the functional/operational blocks in FIG. 2 are merely shown for example. For example, while the autonomous controller 204 is shown connected to the braking controller 206 and then to the brakes 208 in series, other configurations and connections are contemplated. For example, the autonomous controller 204 in some arrangements is configured to send a signal directly to the brakes 208. In this way, parallel signals can be output from the autonomous controller 204 as an added redundancy.

The autonomous brake system 200 in some examples controls the set of multiple electronic brake system valves on a tractor and that can be commanded autonomously or through an operator actuation. Each valve can be controlled independently and modulated electronically to allow for the pre-staging or partial pressurizing of the secondary brake valve set (to a defined pressure level lower than a normal or activation pressure level). For example, the electronic brake valves control a hydraulic brake circuit, where pressure is applied to each wheel/axle (e.g., the wheels 104, 106).

Figure 3:
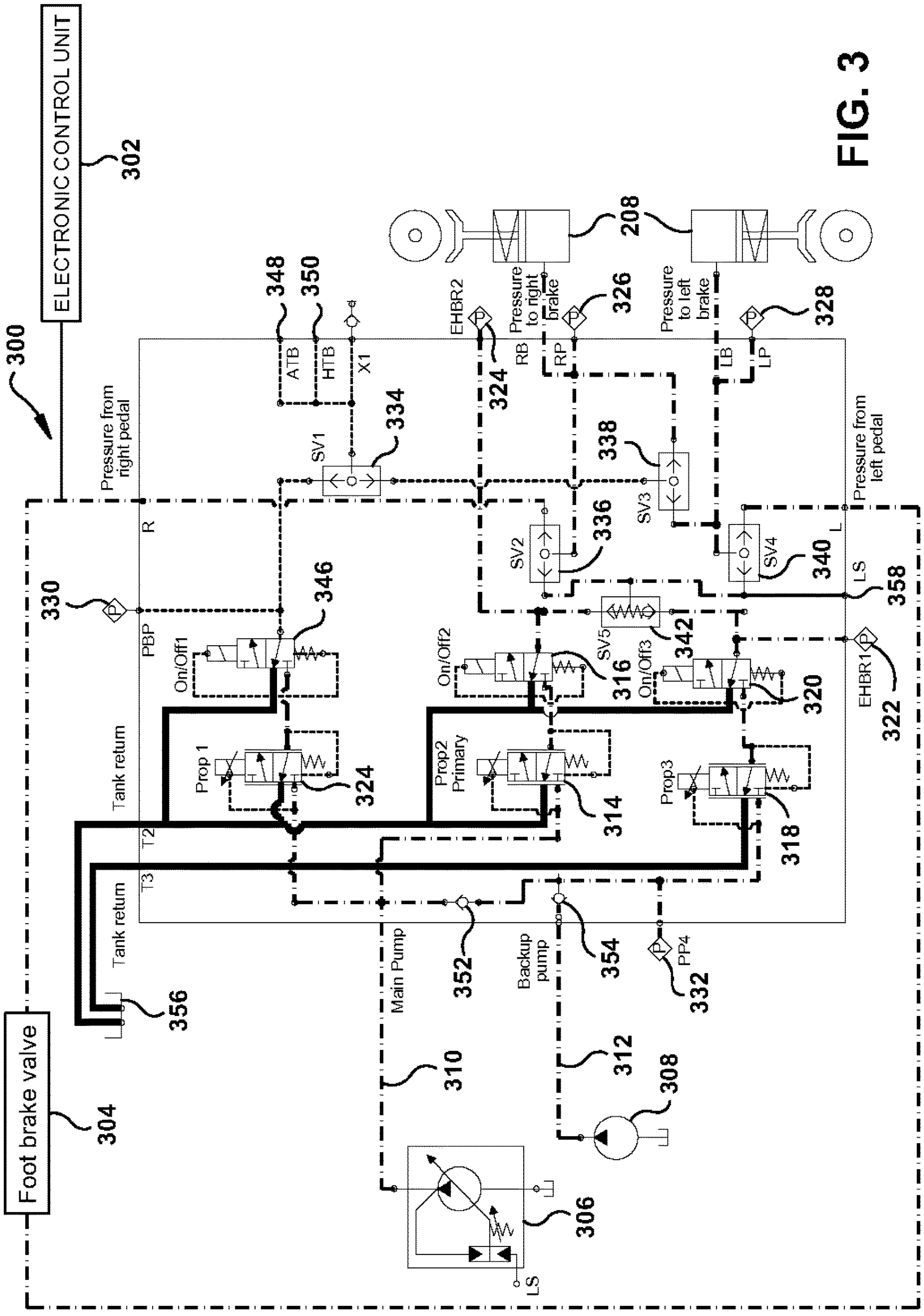
FIG. 3 is a schematic diagram illustrating a brake system according to one implementation.

More particularly, in various examples, multiple power supplies (e.g., hydraulic power sources) and multiple valves are implemented to provide normal operation braking and failure operation braking (which includes pressure already partially applied for the failure braking operation in some examples). That is, backup and/or redundant control is provided in various examples that allows for switching from main braking components to backup braking components, such as in the event of a failure of one or more of the main braking components using redundant control of the multiple valve sets. One example of a brake system 300 is shown in FIG. 3 and can include the brakes 208, illustrated as left and right brakes and operate or form part of the autonomous brake system 200. In other examples, the brakes 208 are front and rear brakes. It should be appreciated that the brakes 208 can be brakes of any type and configured in different ways. The brakes 208 are operated and/or controlled by one or more arrangements described herein, such as shown in FIG. 3. As can be seen, an electronic control unit (ECU) 302 is configured to control operation (e.g., actuation) of the brake system 300, such as one or more components of the brake system 300 as described in more detail herein. For example, the ECU 302 generates control signals that are transmitted to one or more components of the brake system 300 and, in response, the one or more components are actuated and/or controlled. It should be noted that the ECU 302 can be embodied as or included one or more components of the autonomous brake system 200 as illustrated in FIG. 2. The ECU 302 in various examples is connected to one or more control lines (e.g., electrical control lines) or one or more components, such as one or more valves as described in more detail herein.

As can be seen, the brake system 300 includes a primary power supply (also referred to as a primary supply source), configured as a main power supply that powers or is embodied as a main pump 306, and a secondary power supply (also referred to as a secondary supply source), configured as a backup power supply that powers or is embodied as a backup pump 308. In this example, the main pump 306 is a piston pump and the backup pump 308 is a gear pump. However, different types of pumps can be used as the main pump 306 and the backup pump 308. The main pump 306 and the backup pump 308 are configured to selectively supply power to generate a braking force applied by the brakes 208. That is, the main pump 306 and the backup pump 308 operate to provide pump power via one or more valves to the brakes 208 during different braking operations. Thus, one or more examples include a backup power source for the brakes, as well as backup valves (for redundancy) in the case of failure of one or more components as described in more detail herein.

For example, upon application of one or more brake pedals associated with a foot brake valve 304 or generation of one or more control signals by the ECU 302 that are transmitted to one or more components of the brake system 300, one or more valves are triggered such that fluid from a main hydraulic supply line 310 (via the main pump 306 or other pressure source) or fluid from a backup hydraulic supply line 312 (via the backup pump 308 or other pressure source) is delivered to brake actuators. In turn, the brake actuators are controllably actuated to deliver hydraulic brake pressure to, for example, the tractor braking system that includes or forms part of the brakes 208 to control the speed of and/or stop the tractor. As will be described in more detail, the control arrangement of various examples provide redundant and/or backup braking in the event of a failure of the primary braking component(s), such as when a failure of the main supply or in certain failures of the energy transmission path occur. In some examples, this redundant and/or backup braking includes pre-staging the backup braking.

In the illustrated example, the autonomous brake system 200 provides the backup functionality in part using a primary valve set that is configured having a control valve 314 (also referred to as a primary control valve) and an enable valve 316 (configured as a redundant valve to the primary valve 314), and a secondary valve set that is configured having a control valve 318 (also referred to as a secondary control valve) and an enable valve 320 (configured as a redundant valve to the secondary valve 318). The control valve 314 and the enable valve 316 operate as main valves during normal operation and the control valve 318 and the enable valve 320 operate as backup (or redundant) valves during backup or failure operation in some examples. That is, the two valve sets can be operated separately or simultaneously to control pressure applied to the brakes 208 during different conditions of the autonomous brake system 200. As such, in various examples, the control valve 314 and the enable valve 316 are configured as a primary control valve and a secondary control valve respectively, and the control valve 318 and the enable valve 320 are configured as a backup control valve and a backup enable valve, respectively.

More particularly, in some examples, the autonomous brake system 200 provides backup braking using the primary and secondary control valves 314, 318 that are electronically controlled proportional valves connected in parallel. In normal operation, the primary and secondary control valves 314, 318 can be applied simultaneously or individually. In the event of a failure, the non-failed components can be used to slow and/or stop the tractor (e.g. the backup pump 308 or the operational electronic proportional valve, namely the secondary valve 318). Each of the primary and secondary control valves 314, 318 is paired with a second valve in series, namely the enable valves 316, 320. The additional enable valves 316, 320 in series further act as a redundant means, for example, to shut off the proportional valve circuit for diagnostics, when not in use, or in the event of a failed proportional valve (e.g., failure of one of the primary and secondary control valves 314, 318). In some examples, the output of the primary and secondary control valves 314, 318, which are electronically controlled proportional valves, is resolved with pressure commands provided by the operator, before being sent to the tractor foundation brakes (e.g., the brakes 208). This resolved signal provides a load sensing signal to a pump, for example, the main pump 306 or backup pump 308 in some examples.

In various examples, one or more pressure sensors 322, 324, 326, 328, 330, 332 are configured to measure one or more of a primary energy source pressure, a backup energy source pressure, or a resolved brake pressure, as described more detail herein. The one or more pressure sensors 322, 324, 326, 328, 330, 332 can be any type of pressure sensor, and in some examples are pressure transducers. As should be appreciated, one or more of the pressure sensors 322, 324, 326, 328, 330 can be used between the control and enable valves in the electrohydraulic circuits.

In operation, the autonomous brake system 200 is operable to control the brakes 208 using the primary valve set, configured as a hydraulic valve set in some examples, or the secondary valve set, configured as a hydraulic valve set in some examples. As described herein, each of the valve sets include both a proportional solenoid valve as the primary and secondary control valves 314, 318 and a shutoff valve as the enable valves 316, 320. In various examples, ECU 302 is in electrical communication with the hydraulic valve sets to control operation thereof. For example, one or more brake commands can be communicated from the ECU 302 to the first or secondary valve sets. Moreover, the valve sets are also configured to send signals to the ECU 302 in response to operation thereof (e.g., one or more of the one or more of the sensors 322, 324, 326, 328, 330, 332 communicate a pressure associated with one or more of the valve sets to the ECU 302).

In the illustrated example, one or more shuttle valves 334, 336, 338, 340, 342 are fluidly coupled within the flow paths of the autonomous brake system 200. That is, one or more of the shuttle valves 334, 336, 338, 340, 342 are fluidly coupled between the primary and secondary valve sets and the fluid output, where the shuttle valves 334, 336, 338, 340, 342 are movable in response to a difference between a first pressure in a first flow path and a second pressure in a second flow path as described in more detail herein.

For example, the shuttle valve 342 is disposed in fluid communication with the primary valve set and the secondary valve set, namely at the outputs of the enable valves 316, 320. The shuttle valve 342 is configured to be actuated in either direction depending upon which pressure from the enable valves 316, 320 is the greatest. As such, the greater of the two pressures passes through the shuttle valve 342 as a brake pressure, thereby defining primary and backup brake pressure in various examples. That is, primary pressure applied during normal operation is generated by the main pump 306 using the primary valve set (the primary control valve 314 and the enable valve 316) and backup pressure applied during, for example, failure operation is generated by the backup pump 308 using the secondary valve set (the secondary control valve 318 and the enable valve 320).

In operation, outlet pressure from the primary and the secondary valve set may flow through fluid lines, with the hydraulic valve set fluid lines converging upon the shuttle valve 342. Similar to the operation described above, the greater of the brake pressures passes through the shuttle valve 342 (which in this example is spring biased) and enters hydraulic lines that causes hydraulic pressure to be applied to the brakes 208 through the shuttle valves 336, 340. For example, in the event of normal operation or in the event of braking failure, based on a detected pressure at sensors 322, 324, the main pump 306 or the backup pump 308, respectively, acts as the power source (e.g., hydraulic pressure source) that is selectively actuated to apply normal braking operation pressure or backup braking pressure (which may be the same amount of pressure or a different amount of pressure) to the brakes 208 through the shuttle valves 336 and 340. It should be noted that the primary control valve 314 and secondary control valve 318 provide primary and backup braking functionality, and the enable valve 316 and the enable valve 320 provide redundant backup to the primary control valve 314 and secondary control valve 318, respectively. It should be noted that the sensor 322 is a pressure sensor associated with the primary valve set and the sensor 324 is the pressure sensor associated with the secondary valve set.

Further, and continuing with this example, the shuttle valves 336, 340 are disposed in fluid communication with a brake actuator of one of the brakes 208 and a brake actuator of the other one of the brakes 208. The shuttle valves 336, 340 are configured to be actuated in either direction depending upon which brake pressure is the greatest. As such, the greater of the two brake pressures passes through the shuttle valves 336, 340 as a brake pressure. The shuttle valves 336, 340 are configured to apply either the EH brake signal from the autonomous circuit (e.g., the autonomous controller 204) or the service brake signal from the foot operated valve via the operator to one or more of the brakes 208. As should be appreciated, the brake pressure flows downstream from the shuttle valves 336, 340 along one or more fluid lines (e.g., hydraulic lines) in various examples. As such, the primary and secondary control valves 314, 318 modulate pressure electronically under different conditions, namely under normal or failure braking conditions. In various examples, the shuttle valve 342 is configured to resolved primary versus secondary EH braking (e.g., apply primary or backup pressure to one or more of the brakes 208).

Figure 10:
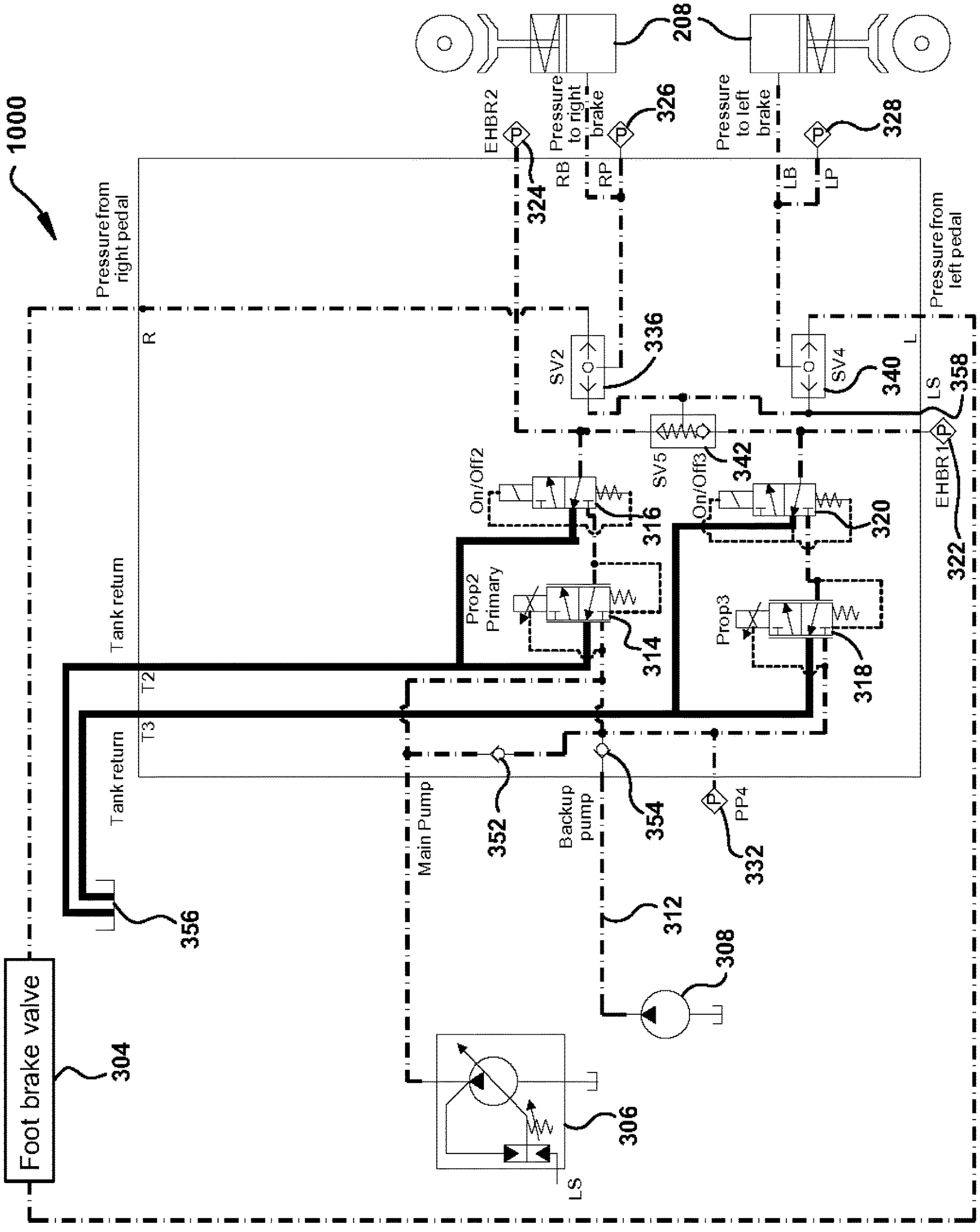
FIG. 10 is a schematic diagram illustrating a brake system according to another implementation.
Figure 11:
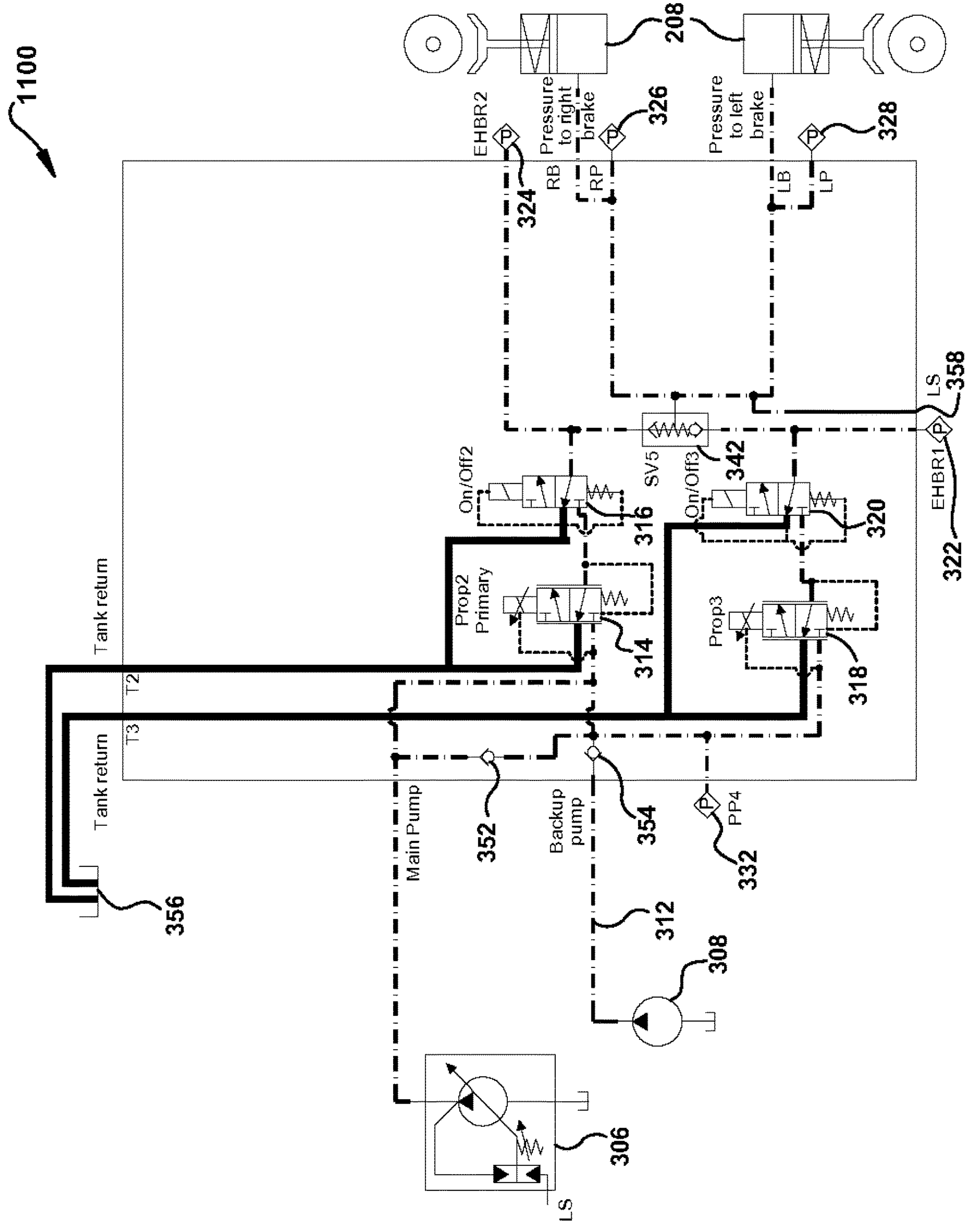
FIG. 11 is a schematic diagram illustrating a brake system according to another implementation.

It should be noted that the autonomous brake system 200 can include additional or optional braking control, such as a trailer brake control that includes a third valve set configured having a control valve 344 and an enable valve 346. This additional or optional control arrangement is configured, for example, as a hydraulic trailer brake circuit in some examples. That is, the hydraulic trailer brake circuit operates in a similar modulated pressure control arrangement having redundancy provided by the control valve 344 and the enable valve 346 to provide braking operation for a trailer in some examples. In operation, the shuttle valve 334 is disposed in fluid communication with the third valve set. The shuttle valve 334 is configured to be actuated in either direction depending upon which pressure, in this example, from the left or right brakes 208 is the greatest and sent to a trailer brake (not shown) for a trailer (or other implement) being towed by the vehicle 100. That is, the greater of the two brake pressures passes through the shuttle valve 334 to perform braking for the trailer in some examples. Thus, the autonomous brake system 200 in some examples includes a trailer brake circuit and in other examples does not include the trailer brake circuit (see brake systems 1000 and 1100 illustrated in FIGS. 10 and 11).

The autonomous brake system 200 includes additional components in various examples, such as check valves 352, 354 that prevent backflow between the main pump 306 and the backup pump 308. Additionally, a hydraulic reservoir 356 (e.g., a hydraulic tank) is provided wherein pressure is brought back to the hydraulic reservoir 356 when the brakes 208 are released.

Figure 4:
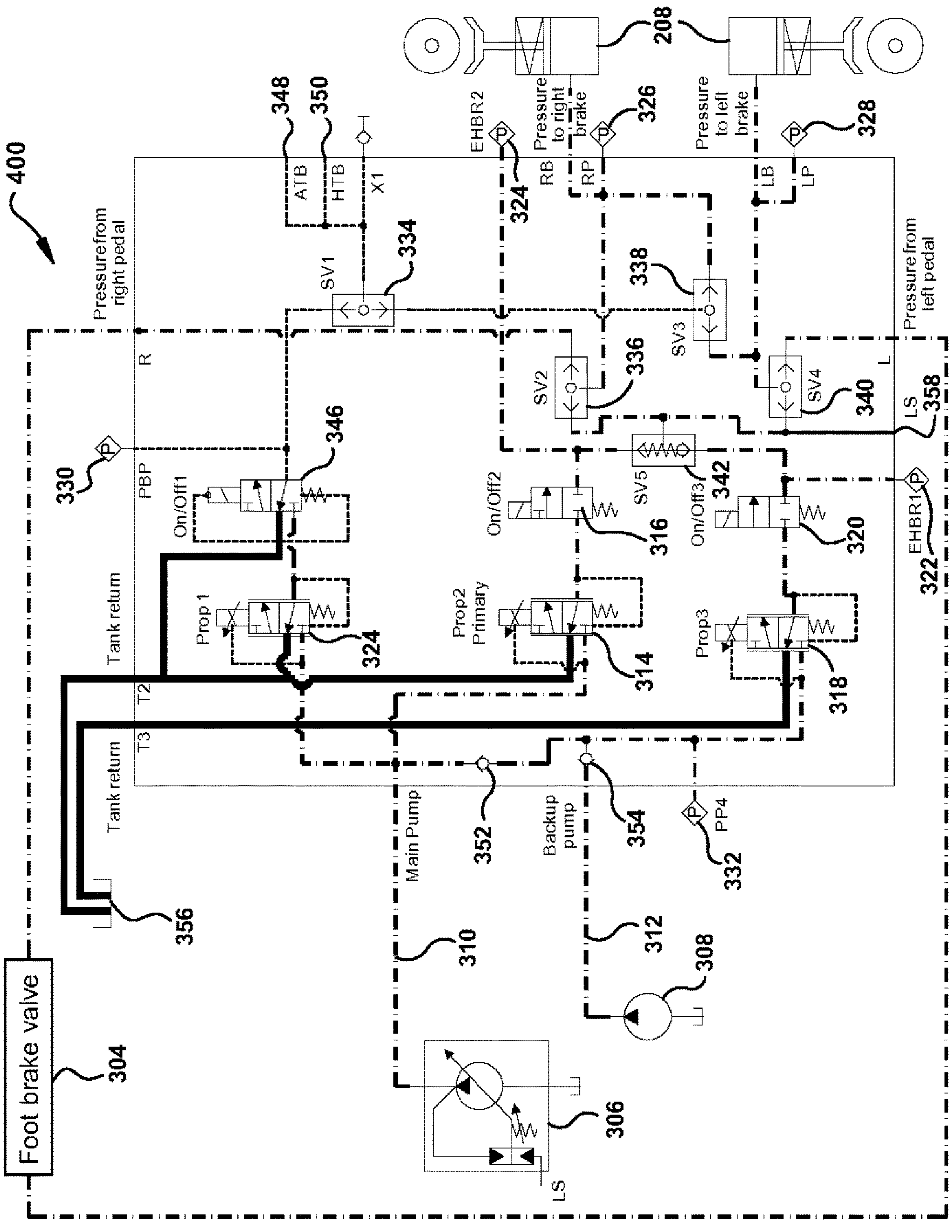
FIG. 4 is a schematic diagram illustrating a brake system according to another implementation.
Figure 6:
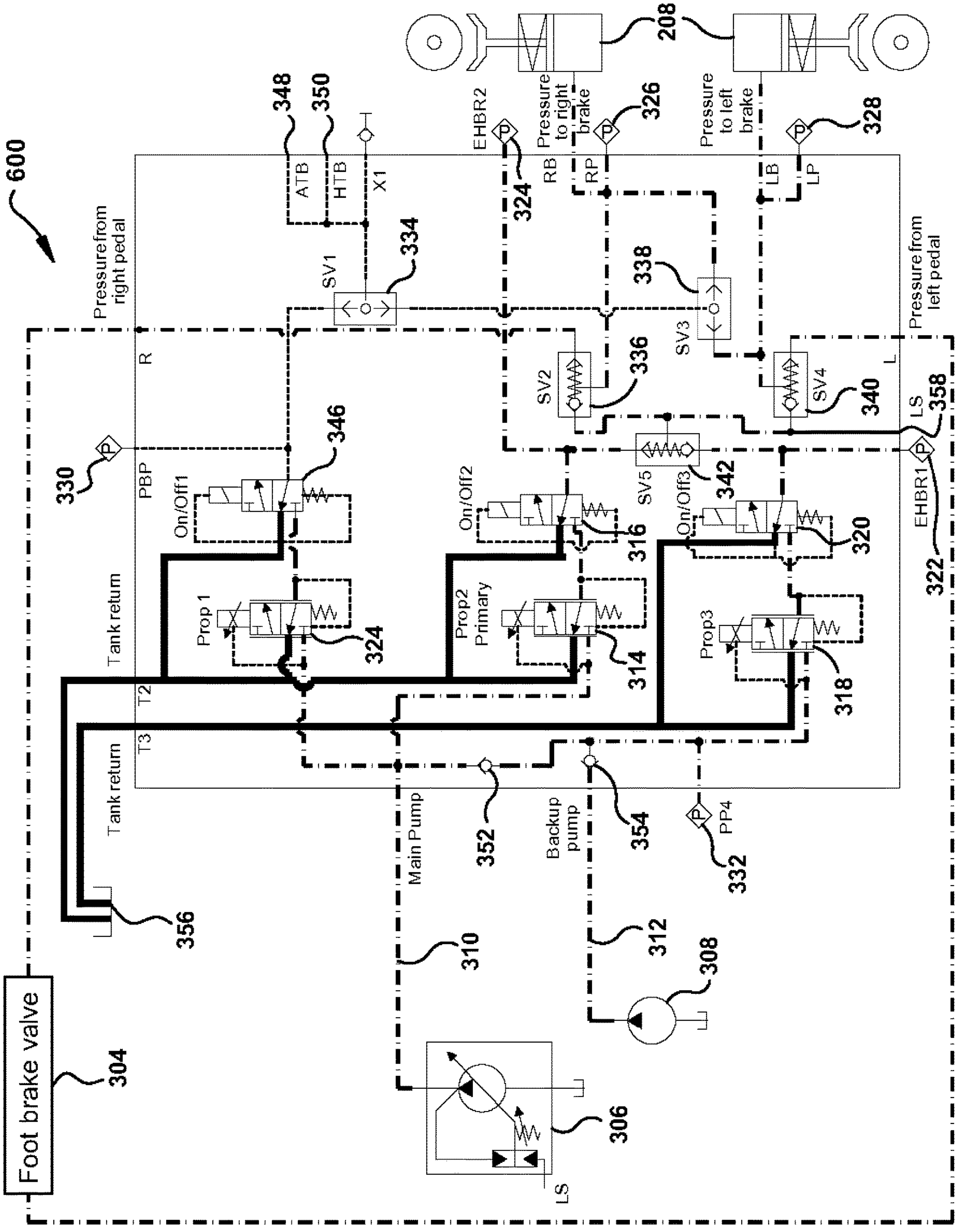
FIG. 6 is a schematic diagram illustrating a brake system according to another implementation.

Variations and modifications to the autonomous brake system 200 are contemplated. For example, the enable valves 316, 320 and the shuttle valve 342, can be any type of valves. That is, while these valves are illustrated as three-way shutoff valves, one or more of these valves can be two-way enable valves (see brake system 400 illustrated in FIG. 4). As another example, while the shuttle valve 336, 340 are illustrated as spring bias shuttle valves, these valves can be other types of shuttle valves, such as non-spring bias shuttle valves (see brake system 600 illustrated in FIG. 6).

Figure 5:
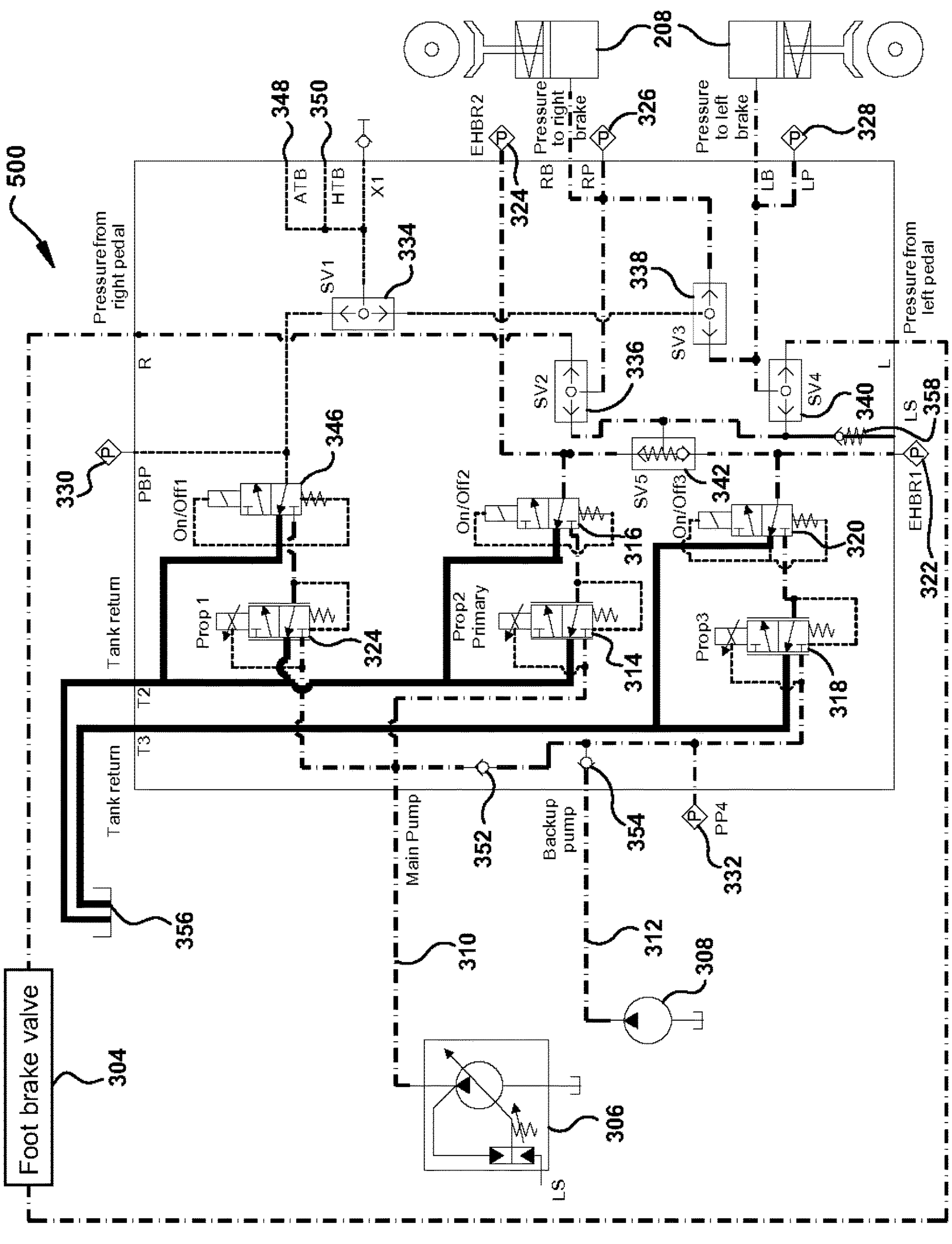
FIG. 5 is a schematic diagram illustrating a brake system according to another implementation.

Additionally, an LS 358 can be dynamic (see brake system 500 illustrated in FIG. 5) or static.

Figure 7:
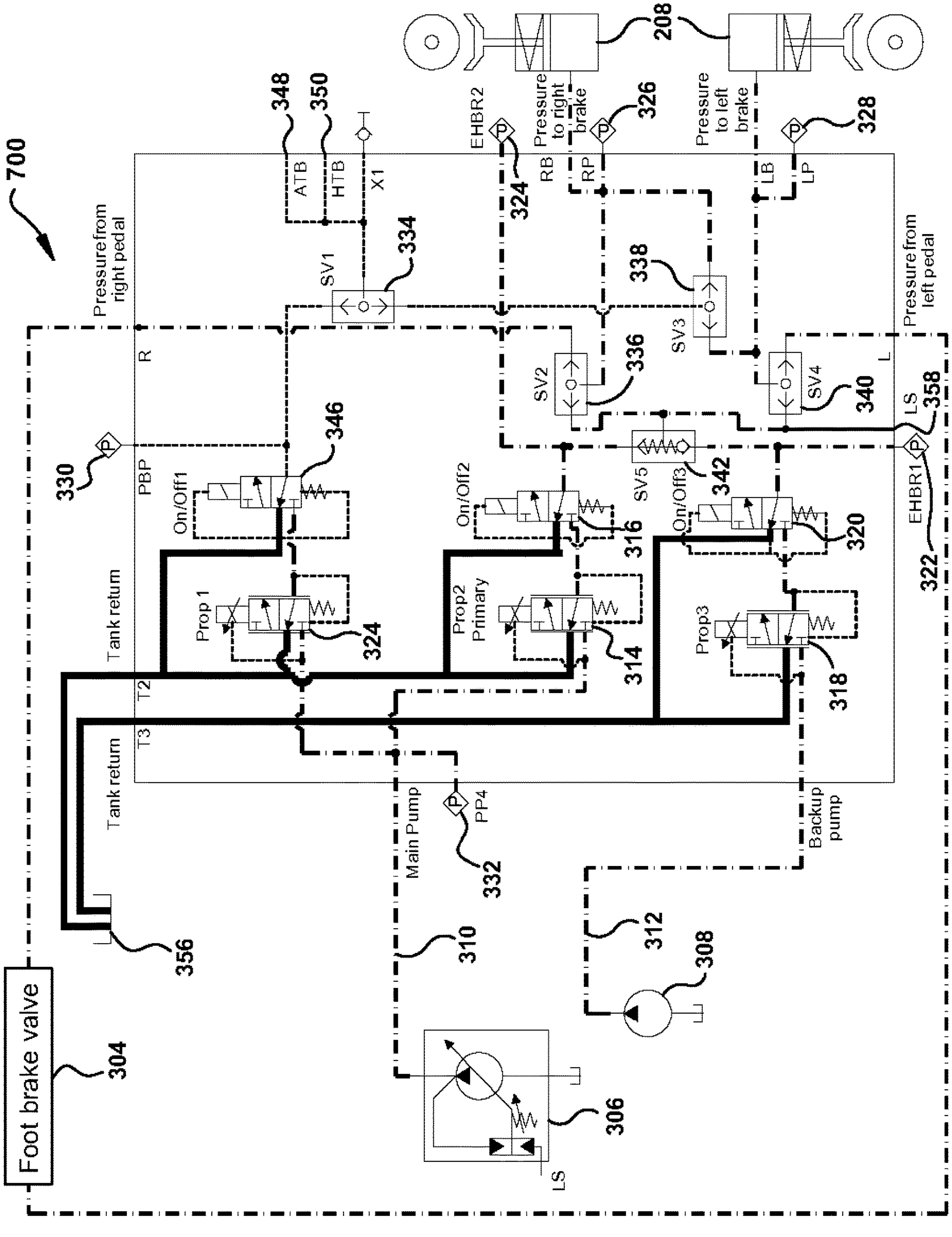
FIG. 7 is a schematic diagram illustrating a brake system according to another implementation.
Figure 8:
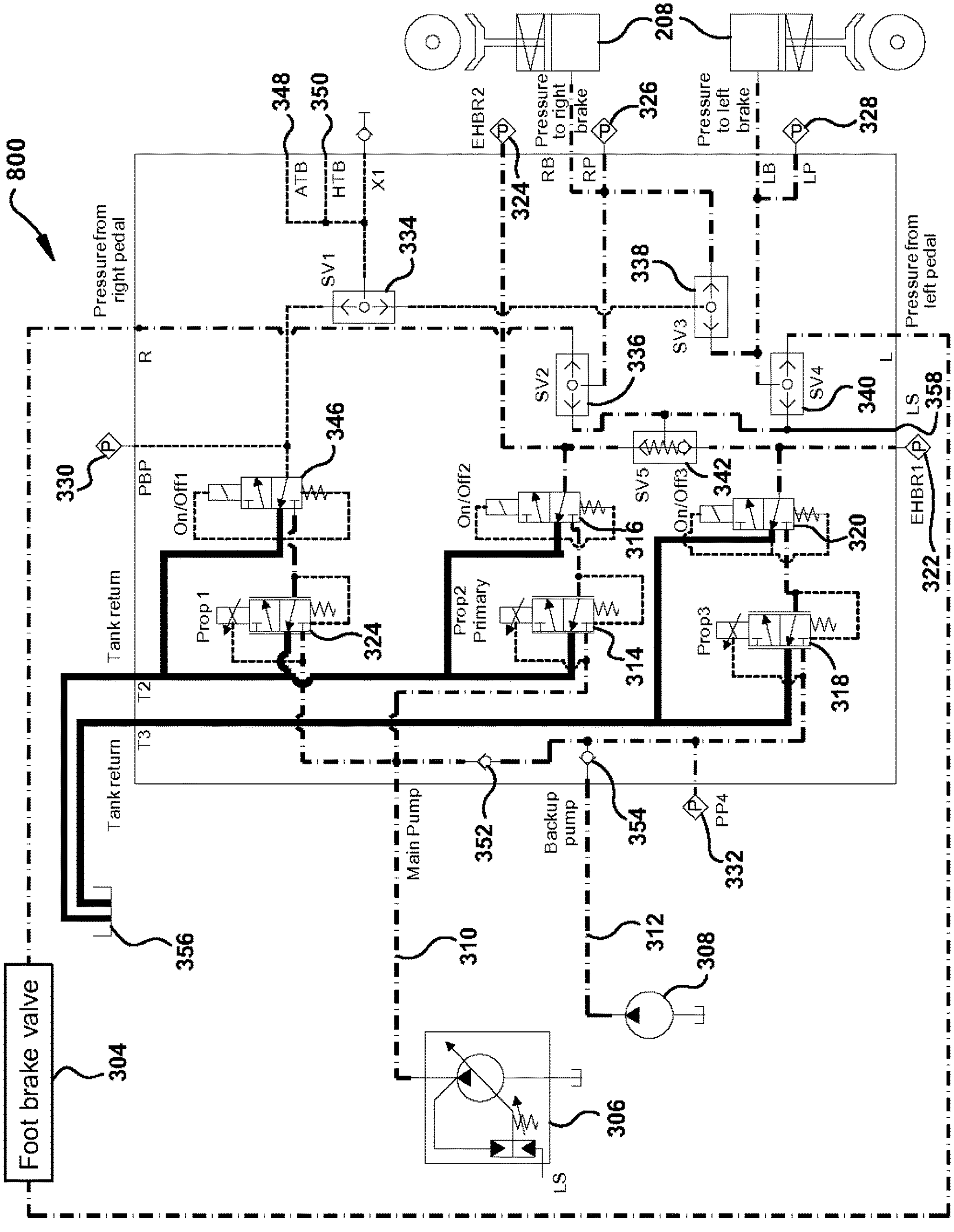
FIG. 8 is a schematic diagram illustrating a brake system according to another implementation.
Figure 9:
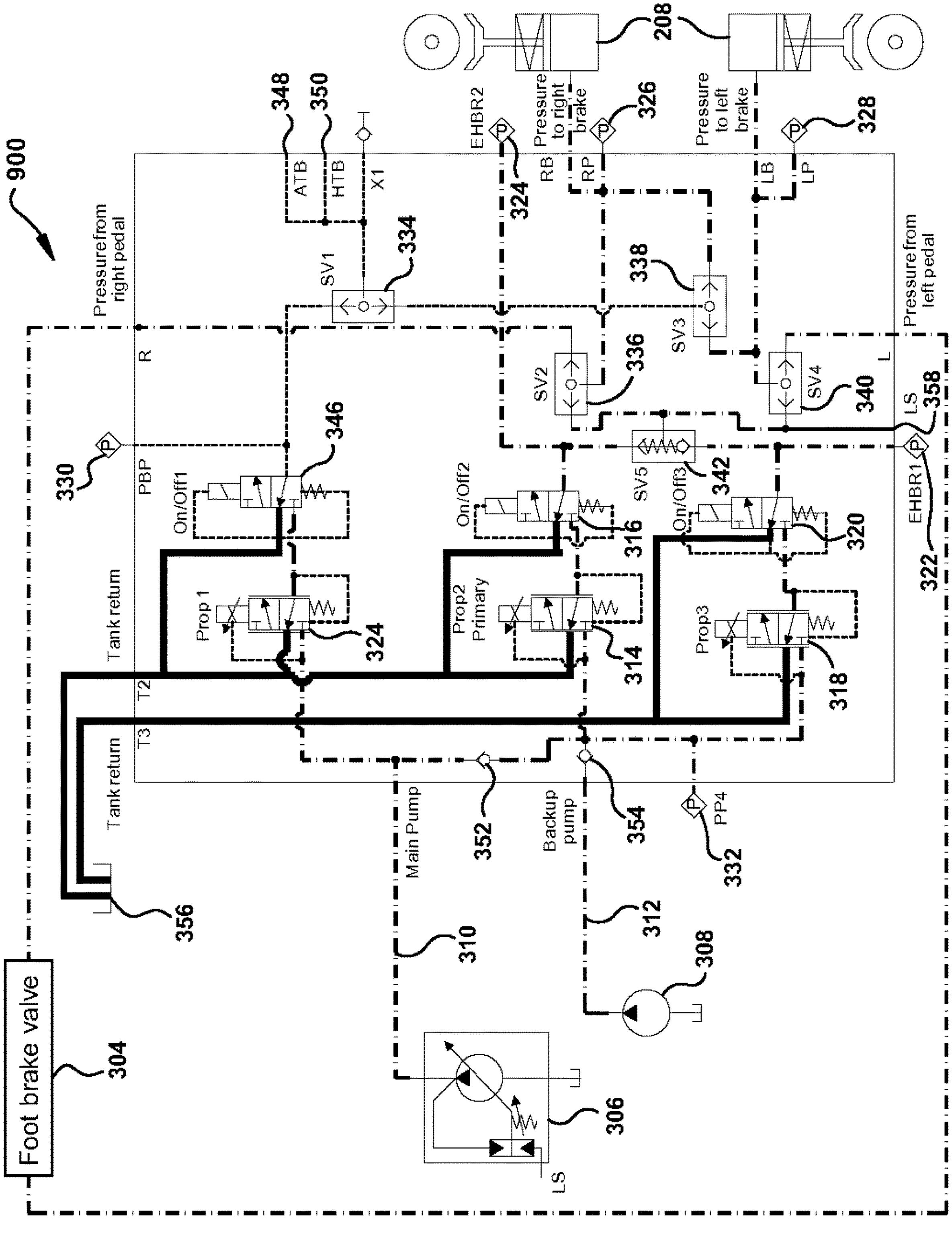
FIG. 9 is a schematic diagram illustrating a brake system according to another implementation.

The autonomous brake system 200 can also be provided in different operational configurations. That is, the conditions under which the main pump 306 supplies power and the conditions under which the backup pump 308 supplies power can be varied. For example, the main pump 306 and the backup pump 308 can operate under different conditions or to resolve different failures, such as shown in Table 1 below, wherein Prop 2 refers to the primary valve 314 and Prop 3 refers to the secondary valve 318 (see brake systems 700, 800, 900 illustrated in FIGS. 7-9 showing the operation and fluid flow paths).

TABLE 1

| Main pump supplies | Backup pump supplies |
|---|---|
| Prop 2 | Prop 3 |
| Prop 2 and Prop 3 | Prop 3 |
| Prop 2 and prop 3 | Prop 2 and prop 3 |

As other examples of variations and modifications, the autonomous brake system 200 can be configured with both proportional circuits in a common manifold or in separate manifolds. For example, the proportional circuits can be packaged in a way that also provides a trailer brake pilot.

Figure 12:
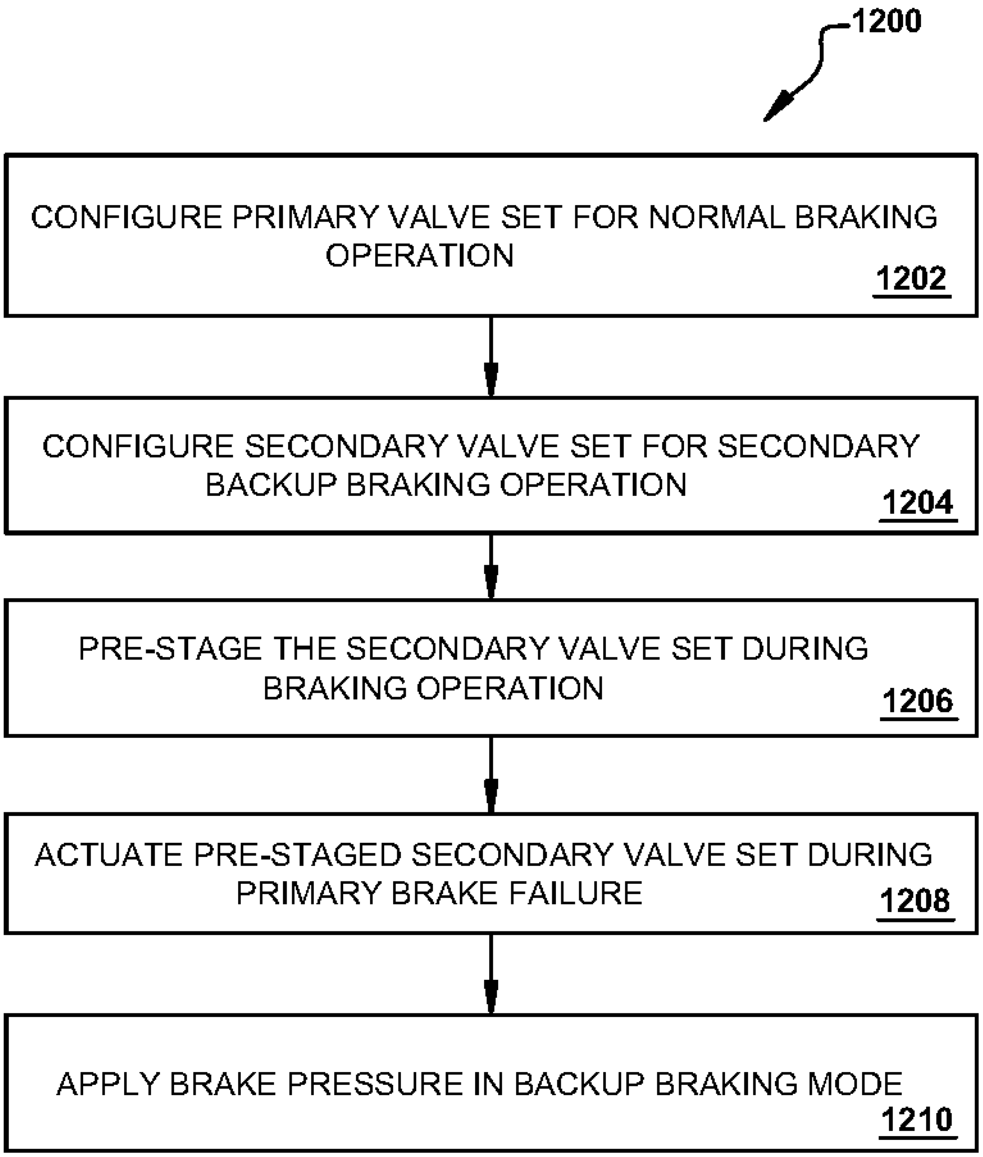
FIG. 12 illustrates an example of a method for configuring a brake system for braking operation according to an implementation.
Figure 13:
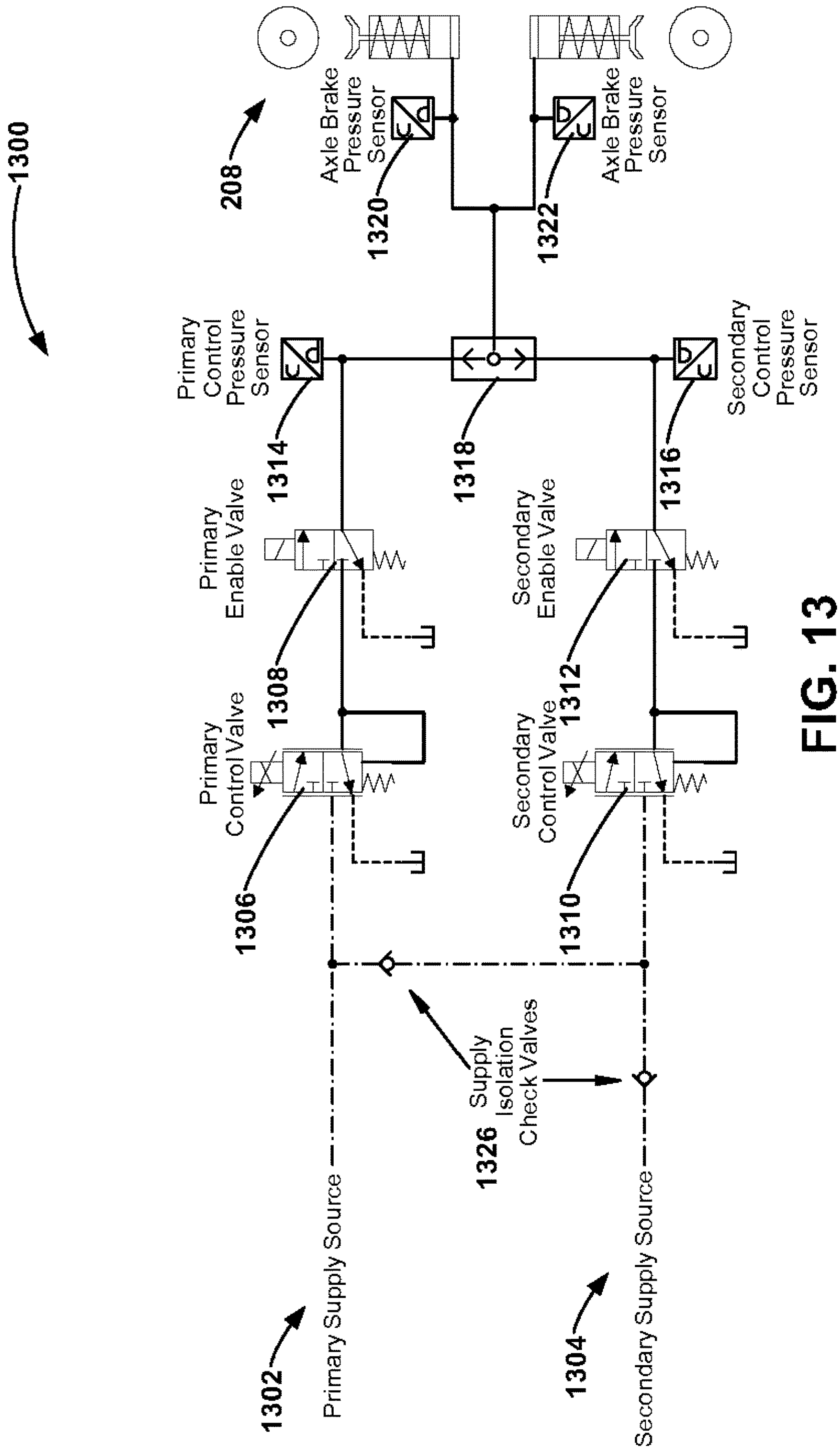
FIG. 13 is a schematic diagram illustrating a control arrangement according to an implementation.
Figure 14:
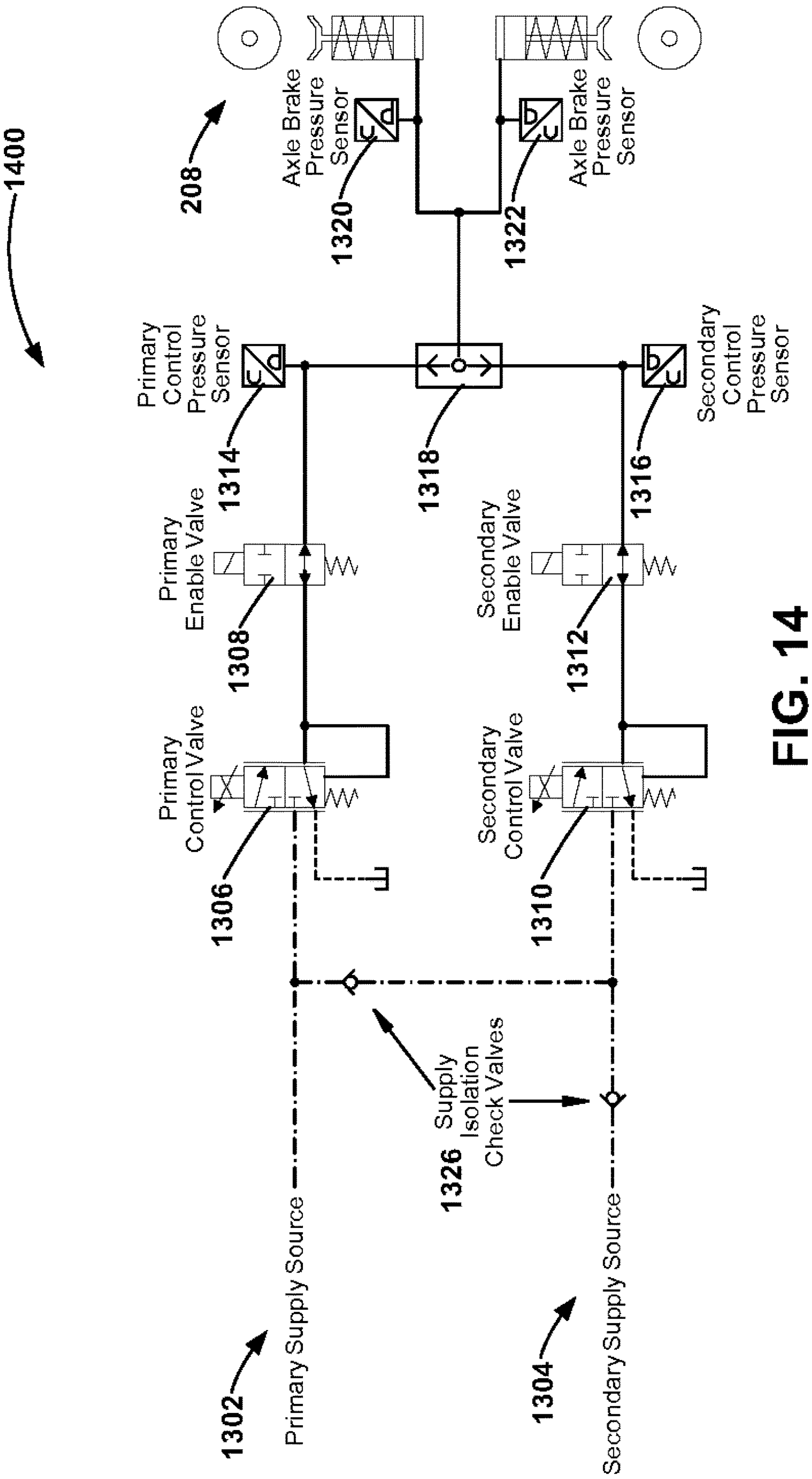
FIG. 14 is a schematic diagram illustrating a control arrangement according to another implementation.
Figure 15:
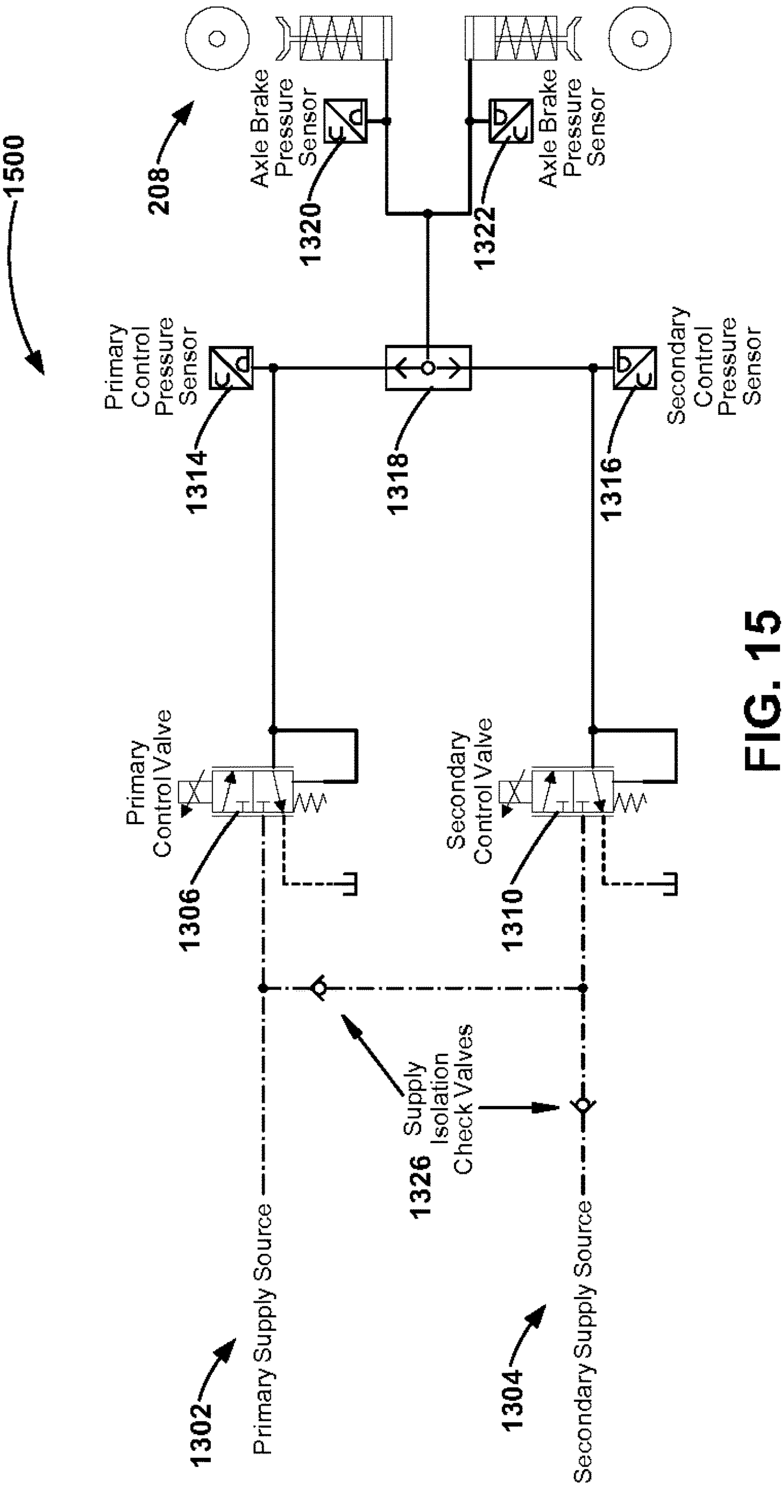
FIG. 15 is a schematic diagram illustrating a control arrangement according to another implementation.
Figure 16:
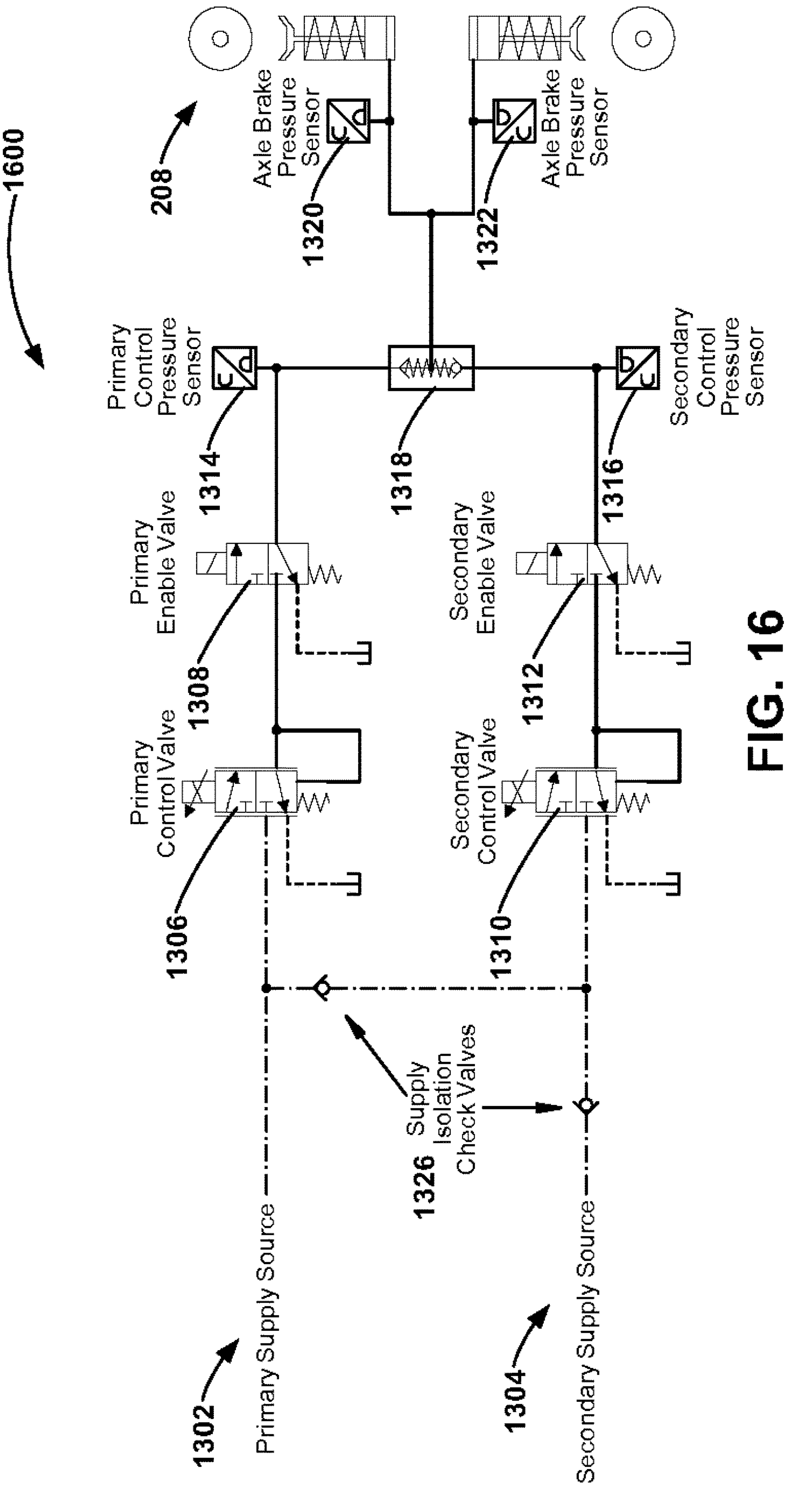
FIG. 16 is a schematic diagram illustrating a control arrangement according to another implementation.
Figure 17:
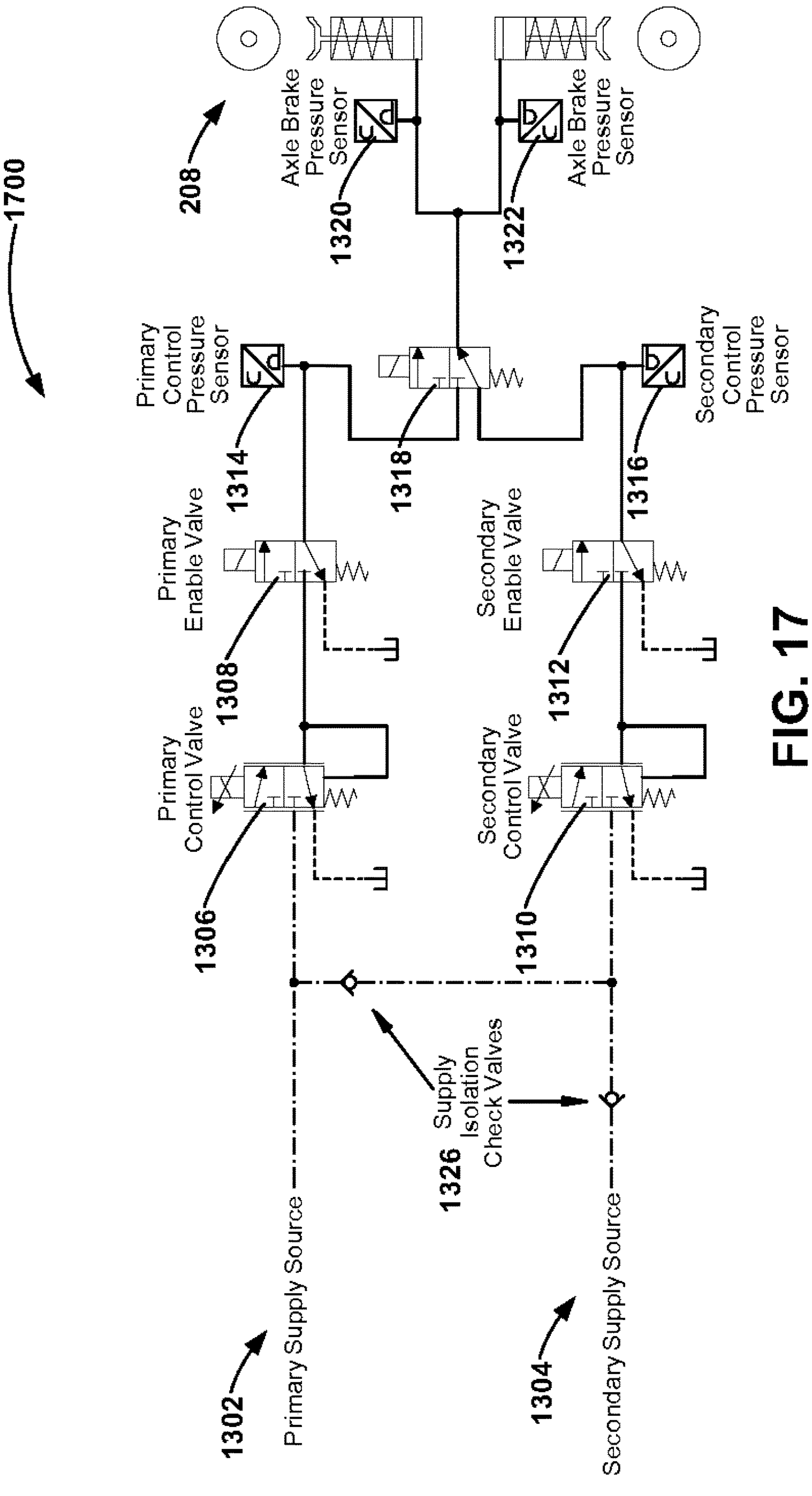
FIG. 17 is a schematic diagram illustrating a control arrangement according to another implementation.

Thus, one or more examples provide a means to actuate brakes, for example, the tractor brakes, autonomously, and in the event of a single point failure, provides a backup means to actuate the brakes. In addition, one or more examples retain the ability for the operator to actuate the brakes from the vehicle cab. In some examples, faster braking is achieved during, for example, brake failure (e.g., primary brake actuation), using a control arrangement that allows for less delay in applying secondary brake actuation. As such, autonomously commanded brakes, such as for a tractor, provide for reduced or minimized additional vehicle stopping distance due to a failure in the primary valve set. For example, when the primary control valve set including the control valve 314 and the enable valve 316 cannot reach or maintain a desired pressure for braking, the secondary control valve set including the control valve 318 and the enable valve 320 are pre-configured or pre-staged to provide faster backup braking operation such as illustrated in the flowchart 1200 of FIG. 12. It should be noted that different control schemes and arrangements are contemplated that allow for controlled operation of the primary and secondary valve sets that can be operated separately or simultaneously to control pressure applied to the brakes 208 during different conditions of the autonomous brake system 200. That is, the flowchart 1200 illustrates operations involved in configuring a braking system, such as the autonomous brake system 200 to improve braking operation, particularly autonomous braking operation when primary braking functionality or systems fail or are not operating satisfactorily. In some examples, the operations of the flowchart 1200 are performed using one or more configurations described in more detail herein.

The flowchart 1200 commences at 1202, which includes configuring a primary valve set for normal braking operation. For example, the control valve 314 and the enable valve 316 are configured to apply a desired or required pressure to vehicle brakes during normal braking operation, such as when vehicle braking is commanded autonomously or by an operator actuation. The primary valve set in some examples is configured to be commanded to a pressure to thereby supply power from a primary supply source (e.g., the main pump 306) to generate a braking force during normal operation. In some examples, normal operation refers to operation wherein the primary valve set is able to reach and maintain the desired pressure to generate the braking force.

A secondary valve set for secondary backup braking operation is configured at 1204, which includes configuring a secondary valve set for backup braking operation. For example, the control valve 318 and the enable valve 320 are configured to apply a desired or required pressure to vehicle brakes during backup braking operation, such as when vehicle braking is commanded autonomously or by an operator actuation and that braking cannot be satisfactorily provided by the primary valve set. The secondary valve set in some examples is configured to be commanded to a pressure to thereby supply power from a secondary supply source (e.g., the backup pump 308) to generate a braking force during backup operation. In some examples, backup operation refers to operation wherein the primary valve set is unable to reach and/or maintain the desired pressure to generate the braking force.

The secondary valve set is pre-staged during braking operation at 1206. For example, when braking operation is initiated (which may be autonomously or by an operator), after a defined time period (e.g., after a time delay after actuation of braking operation), the secondary valve set is commanded to a pressure less than the primary valve set. That is, the secondary valve set is placed in a pre-staged mode such that, if needed, the secondary valve set can more quickly be commanded to the pressure desired for the primary valve set and that either was not reached or was not maintained. In some examples, the secondary valve set thereby has pressure already partially applied (pre-applied) when braking operation is initiated by activating the enable valve 318 such that the secondary valve 320 is commanded to the desired lower pressure to pre-stage the secondary valve set if needed. It should be noted that during the normal operation when braking operation is initiated, the enable valve 316 of the primary valve set is activated to provide primary braking operation such that the primary control valve 314 is commanded to the desired pressure to apply braking force to the brakes.

In the event the primary valve set cannot reach or maintain the desired pressure, such as during primary brake failure, the pre-staged secondary valve set is actuated at 1208, such that the commanded pressure is increased to be equal to the primary pressure, namely the pressure that was desired for the primary valve set. That is, the pre-staged secondary valve set is commanded to increase from the pre-staged pressure to the operating pressure to allow for braking operation to be performed. In this configuration, the additional pressure needed for the pre-staged secondary valve set to reach the desired operating pressure is much smaller (such as if no pressure is applied to pre-stage the secondary valve set). As such, actuation of the brakes using the pre-staged secondary valve set occurs faster than redundant or backup braking without any pre-staging. With the pre-staged secondary valve set now at the desired brake pressure, the brake pressure is applied at 1210. That is, in this backup operation (backup braking mode), the pressure applied to the pre-staged secondary valve set is incremented (increased) from the lower pre-stage level to the operating level to allow for more rapid backup braking operation.

Various examples of arrangements for controlling brake operation are illustrated in FIGS. 13-17, which illustrate different configurations of controls that can be used to provide primary and backup braking operation, including pre-staging of the backup braking as described in more detail herein. That is, the arrangements can be controlled as described herein to provide more rapid and/or effective backup braking operation. In some examples, the arrangements can be embodied as or form part of one or more of the brake systems 300-1100 illustrated in FIGS. 3-11.

As can be seen, the control arrangements 1300, 1400, 1500, 1600, 1700 include a primary supply source 1302 and a secondary supply source 1304. In some examples, the primary supply source 1302 is configured as the primary power supply which is a main power supply (e.g., the main pump 306), and the secondary supply source 1304 is configured as the secondary power supply which is a backup power supply (e.g., the backup pump 308). The primary supply source 1302 and the secondary supply source 1304 are configured to selectively supply power to generate a braking force applied by the brakes 208. That is, the primary supply source 1302 and the secondary supply source 1304 operate to provide pump power via one or more valves to the brakes 208 during different braking operations. Thus, one or more examples include a backup power source for the brakes, as well as backup valves (for redundancy) that can be pre-staged and more rapidly used in the case of failure of one or more components as described in more detail herein.

In operation, a primary control valve 1306 (which can be embodied, for example, as the primary control valve 314) and a primary enable valve 1308 (which can be embodied, for example, as the primary enable valve 316) are configured for operation during normal braking. That is, when braking is desired, the primary control valve 1306 and the primary enable valve 1308 are commanded to apply a brake pressure from the primary supply source to the brakes 208. If the primary control valve 1306 and the primary enable valve 1308 are unable to provide or maintain a desired braking pressure, a secondary control valve 1310 (which can be embodied, for example, as the secondary control valve 318) and a secondary enable valve 1312 (which can be embodied, for example, as the secondary enable valve 320) are configured for operation during backup braking (e.g., when primary braking failure occurs). As described in more detail herein, the secondary control valve 1310 and the secondary enable valve 1312 (forming the secondary valve set) are configured to be pre-staged to allow partial pressure to be applied thereto to reduce the time to reach full desired pressure in the event that the primary control valve 1306 and the primary enable valve 1308 (forming the primary valve set) are unable to provide or maintain a desired braking pressure.

In various examples, a primary control pressure sensor 1314 monitors the pressure being applied by the primary valve set and a secondary control pressure sensor 1316 monitor the pressure being applied by the secondary valve set. In some examples, the primary control pressure sensor 1314 and secondary control pressure sensor 1316 transmit pressure monitoring signals to the ECU 302 to determine whether primary braking or backup braking is desired or needed. That is, the ECU 302 is configured in some examples to perform one or more control methods described herein that allow backup braking to be performed when the primary control pressure sensor 1314 indicates that the pressure being applied to the brakes 208 is not at the desired level.

In the various examples, a directional control valve, illustrated as a shuttle valve 1318 (which may be embodied, for example, as the shuttle valve 342), is disposed between the outputs of the primary and secondary valve sets. That is, the shuttle valve 1318 is disposed in fluid communication with the primary valve set and the secondary valve set, namely at the outputs of the primary and secondary enable valves 1308, 1312. In some examples, the shuttle valve 1318 is configured to be actuated in either direction depending upon which pressure from the enable valves 1308, 1312 is the greatest. As such, the greater of the two pressures passes through the shuttle valve 1318 as a brake pressure, thereby defining primary and backup brake pressure in various examples. That is, primary pressure applied during normal operation is generated by the primary supply source 1302 using the primary valve set (the primary control valve 1306 and the primary enable valve 1308) and backup pressure applied during, for example, failure operation is generated by the secondary supply source 1304 using the secondary valve set (the secondary control valve 1310 and the enable valve 1312).

It should be noted, as described herein, additional sensors or monitors are provided in one more examples to allow for determining the operating condition or state of various components. In the various arrangements, axle brake pressure sensors 1320, 1322 are provided to monitor a pressure level applied to the brakes 208. In some examples, the pressure sensed by the axle brake pressure sensors 1320, 1322 is used by the ECU 302 to control actuation of the primary and secondary valve sets as described in more detail herein. That is, feedback from the axle brake pressure sensors 1320, 1322, as well as from the primary control pressure sensor 1314, and the secondary control pressure sensor 1316 are processed by the ECU 302 to determine the braking operation to be performed, including whether backup braking is to be used.

Various additional or alternate components can be provided. For example, one or more components as illustrated in the brake systems 200-1100 can be implemented in, be embodied as, or form part of the control arrangements 1300, 1400, 1500, 1600, 1700. In some examples, supply isolation check valves 1326 are provided between the primary and secondary supply sources 1302, 1304 and the primary and secondary valve sets. The isolation check valves 1326 allow fluid flow there through from the primary and secondary supply sources 1302, 1304 to the respective primary and secondary valve sets while preventing backflow.

Variations and modifications are contemplated. For example, in the control arrangement 1400, the primary and secondary enable valves 1308, 1312 are configured as two-way valves, whereas the primary and secondary enable valves 1308, 1312 are configured as three-way valves in the other arrangements. As another example, the control arrangement 1500 includes the primary and secondary control valves 1306, 1310, but does not include the primary and secondary enable valves 1308, 1312 as in the other arrangements. As still another example, in the control arrangement 1600, the shuttle valve 1318 is configured as a spring bias shuttle valve, whereas in the other arrangements the shuttle valve 1318 is configured as a non-spring bias shuttle valve (in the control arrangements 1300, 1400, 1500 the shuttle valve 1318 is configured as a two-way valve and in the control arrangement 1700 the shuttle valve 1318 is configured as a three-way valve).

Figure 18:
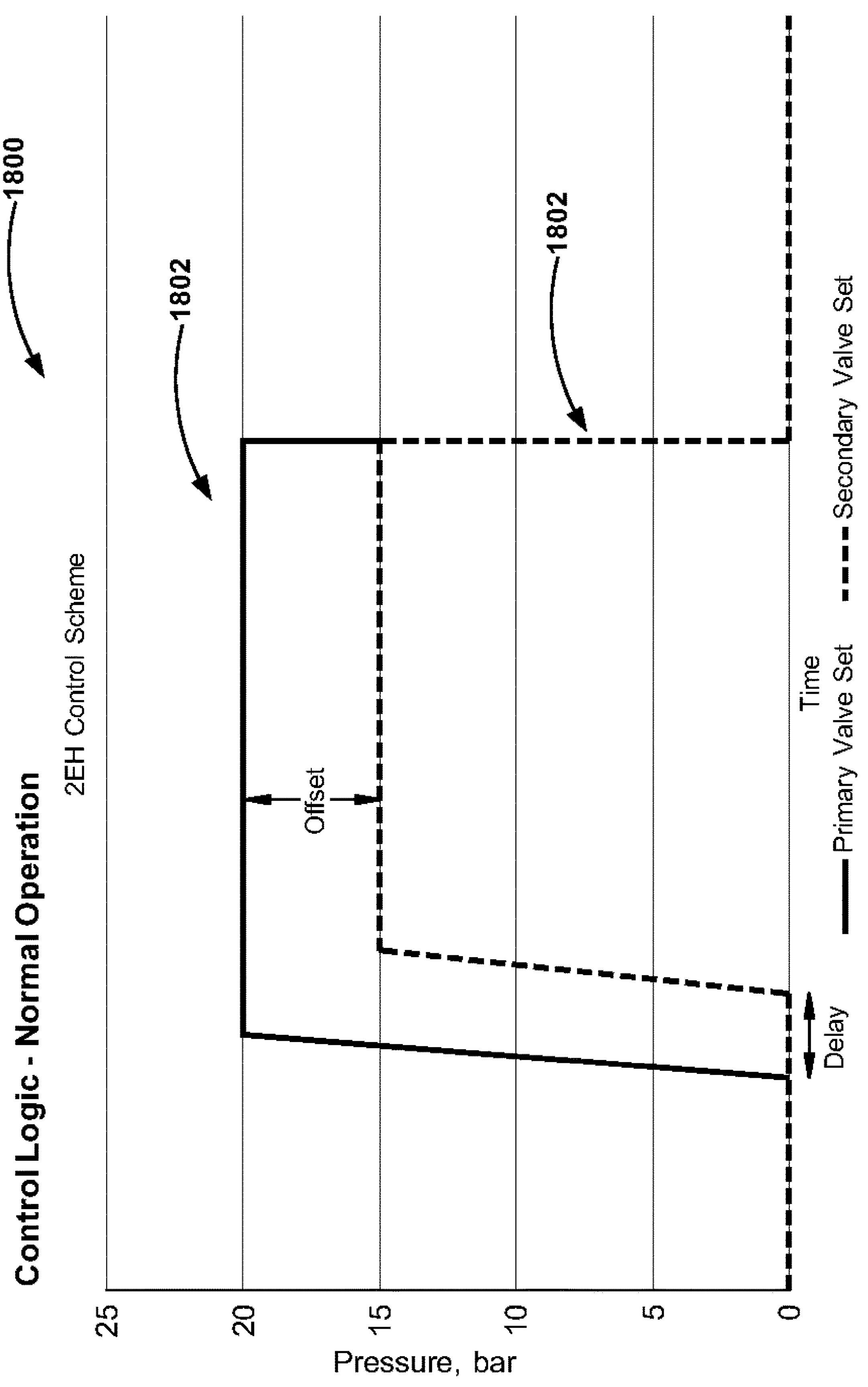
FIG. 18 is a graph illustrating control logic according to an implementation.
Figure 19:
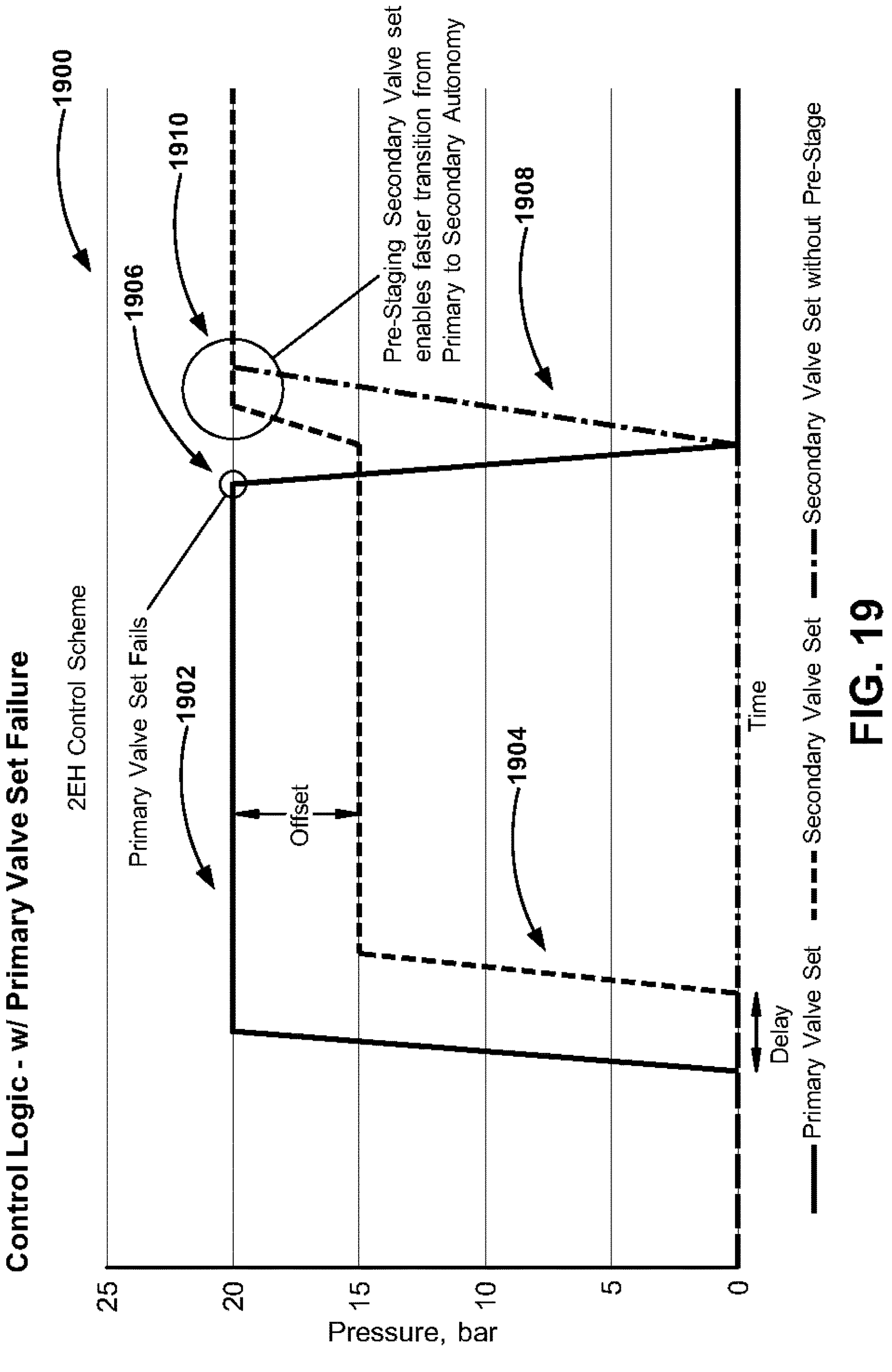
FIG. 19 is another graph illustrating control logic according to an implementation.

In various examples, different control logic is implemented to perform primary and backup braking. That is, the ECU 302 in various examples is configured or programmed to perform normal backup operation as illustrated in FIG. 18 and configured or programmed to perform failure operation as illustrated in FIG. 19. As illustrated in graph 1800, showing sequencing of valves during normal operation, the primary valve set pressure is shown by plot 1802 and the secondary valve set pressure is shown by plot 1804. As can be seen, when braking operation is desired, the primary valve set is first commanded to increase to a defined pressure level using a control profile having a first pressure increase slope (e.g., a first defined pressure illustrated as 20 bar) and applied to the brakes for perform braking operation. In response to desired braking operation, the secondary valve set is also commanded to a defined pressure level using a control profile having a second pressure increase slope (e.g., a second defined pressure illustrated as 15 bar) that is lower than the defined pressure level for the primary valve set (which is an offset pressure), such that the secondary valve set is partially pressurized. That is, the secondary valve set is pre-staged to a lower pressure level to allow for more rapid increase (in this example 5 bar) if backup or primary failure braking is needed. The first pressure increase slope and the second pressure increase slope define the amount of time for the respective pressure levels to be reached. It should be noted that the first pressure increase slope and the second pressure increase slope can be the same (have the same slope) or be different (have different slopes), such as depending on a level of aggressiveness in reaching the desired pressure level. Thus, the decay rates represented in the graphs can be controlled independently in various examples In some examples, the pre-staging of the secondary valve set, namely the commanding of the secondary valve set to the defined pressure level (backup pressure level) occurs after a delay from the activation of the brakes. That is, the primary valve set is first commanded to increase pressure to the defined level that is an operating level to apply suitable force to accomplish braking by the brakes, and after a delay time period (e.g., defined waiting period), the secondary valve set is commanded to increase pressure to the defined level that is below the operating level, such as at a pre-stage level or backup level.

In the control logic example illustrated by the graph 1800, backup or secondary braking is not needed, such that pressure to both the primary valve set and the secondary valve set is reduced (back to zero bar) once braking is no longer desired. As can be seen, once braking is no longer desired, the primary valve set and the secondary valve set are commanded at the same time to de-actuate and lower the pressure applied thereto. It should be noted that the decay rates represented in the graphs can be controlled independently in various examples. For example, the primary valve set and the secondary valve set can be independently commanded and at different times in some examples.

As illustrated in graph 1900, showing sequencing of valves during a braking failure (e.g., primary valve set failure) operation, the primary valve set pressure is shown by plot 1902 and the secondary valve set pressure is shown by plot 1904. Similar to the graph 1800, when braking operation is desired, the primary valve set is first commanded to increase to a defined pressure level (illustrated as 20 bar) and applied to the brakes for perform braking operation. In response to desired braking operation, the secondary valve set is also commanded to a defined pressure level (illustrated as 15 bar) that is lower than the defined pressure level for the primary valve set, such that the secondary valve set is partially pressurized. That is, the secondary valve set is pre-staged to a lower pressure level to allow for more rapid increase (in this example 5 bar) if backup braking is needed. In some examples, the pre-staging of the secondary valve set, namely the commanding of the secondary valve set to the defined pressure level (backup pressure level) occurs after a delay from the activation of the brakes. That is, the primary valve set is first commanded to increase pressure to the defined level that is an operating level to apply suitable force to accomplish braking by the brakes, and after the delay time period (e.g., defined waiting period), the secondary valve set is commanded to increase pressure to the defined level that is below the operating level, such as at a pre-stage level or backup level, similar to the graph 1800.

In the control logic example illustrated by the graph 1900, backup or secondary braking is needed as illustrated at the primary brake set failure point 1906. That is, at the primary brake set failure point 1906, the primary valve set is no longer able to maintain the desired pressure level (here 20 bar), such as determined by the one or more sensors as described in more detail herein. In response to this determination, the secondary valve set is commanded to increase pressure to the normal operation level (from 15 bar to 20 bar in this example), such that suitable braking force can be applied to the brakes. As can be seen, at the primary brake set failure point 1906 the primary valve set is disabled or de-actuated with the pressure applied by the primary valve set lowered, and the secondary valve set is enabled or actuated with the corresponding increase in the pressure, which can occur more rapidly as a result of the pre-staging. That is, without the pre-staging, the secondary valve set pressure increases as illustrated by the plot portion 1908 and takes longer to reach operating pressure to apply the desired pressure to the brakes. For example, pre-staging of the second valve set enables faster transition at 1910 from primary to secondary autonomy.

Figure 20:
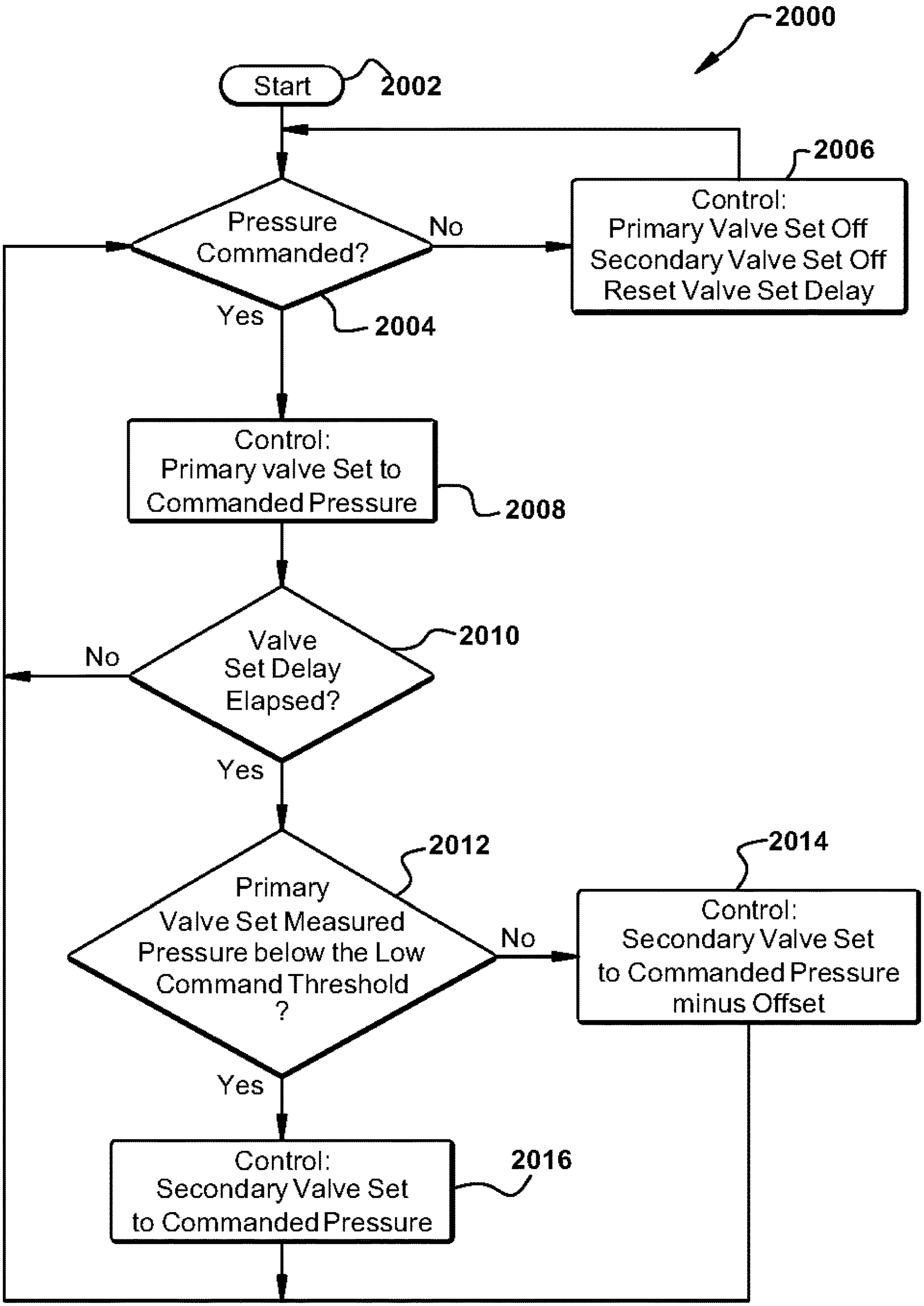
FIG. 20 illustrates an example of a method for controlling backup braking operation according to an implementation.

As such, autonomously commanded brakes, such as for a tractor, provide for reduced or minimized additional vehicle stopping distance due to a failure in the primary valve set using the control logic in the examples of FIGS. 18 and 19. A flowchart 2000 illustrating the operations performed in accordance with the logic in some examples is illustrated in FIG. 20. That is, the flowchart 2000 illustrates operations involved in configuring a braking system, such as the autonomous brake system 200 to improve braking operation, particularly autonomous braking operation when primary braking functionality or systems fail or are not operating satisfactorily. In some examples, the operations of the flowchart 2000 are performed using one or more configurations described in more detail herein.

The flowchart 2000 commences at 2002, such as when operation of the tractor is initiated and the ECU 302 is activated. That is, the ECU 302 is activated and configured to control the set of multiple electronic brake system valves on the tractor, wherein the brakes can be commanded autonomously or through an operator actuation. As described in more detail herein, each valve can be controlled independently and modulated electronically, such that the electronic brake valves control a hydraulic brake circuit, where pressure is applied to each wheel/axle in various examples.

At 2004, a determination is made whether brake pressure is commanded. For example, a determination is made whether braking of the tractor is desired in response to an autonomous application or through an operator actuation (e.g., physically depressing a brake pedal within the tractor cab). If pressure is not commanded, then the primary and second valves sets are maintained in an off state (deactivated) and a valve set delay is reset at 2006 (e.g., the defined delay between actuation of the primary valve set and the secondary valve set as illustrated in FIGS. 18 and 19 is reset).

If a determination is made at 2004 that brake pressure is commanded, then at 2008 one or more control commands are provided wherein the primary valve set is commanded to a defined pressure. For example, an enable valve of the primary valve set is first actuated, and then a proportional valve is commanded to the desired pressure. During a normal braking application, the primary valve set is commanded to desired pressure, such as, $P_{primary}$. A determination is then made at 2010 whether the valve set delay has elapsed. If the delay has not elapsed then a determination is again made whether brake pressure is commanded at 2004. If a determination is made that the delay has elapsed, then a determination is made at 2012 whether the primary valve set pressure is below a low command threshold. That is, a determination is made whether the primary valve set is able to maintain the desire pressure. If a determination is made that the primary valve set pressure is not below the low command threshold (e.g., the low command threshold is defined to be less than the first defined pressure or normal operating pressure and greater than the second defined pressure or offset pressure), one or more control commands are made at 2014 such that the secondary valve set is commanded to a pressure level minus an offset, namely to the offset pressure. That is, after a time delay, $t_{delay}$, the secondary valve set is commanded to a pressure less than the primary valve set, wherein $P_{secondary}=P_{primary}-P_{offset}$. A determination is then again made at 2004 whether brake pressure is still commanded.

If a determination is made that the primary valve set pressure is below the low command threshold, one or more control commands are made at 2016 such that the secondary valve set is commanded to the full operating pressure. That is, the secondary valve set is commanded to increase pressure from the offset pressure level to the operating pressure level. It should be noted that in some examples (e.g., in some failure conditions) the primary valve set is disabled as well (e.g., one or more control commands are made to de-actuate the primary valve set that is unable to maintain proper braking pressure). However, in other examples, the primary valve set is not disabled. A determination is then again made at 2004 whether brake pressure is still commanded. As should be appreciated, once the brakes are no longer commanded, both the primary and secondary valve sets are de-actuated.

Thus, in the event the primary valve set cannot reach or maintain the desired pressure ($P_{primary}$), the secondary valve set increases its command to be equal to the primary pressure ($P_{secondary}=P_{primary}$). In this case, the system reduces or minimizes the delay time for the secondary brake valve set to reach the operating pressure level at which the primary valve set was operating, by having the pressure already partially applied. As such, the system reduces or minimizes the increase in vehicle stopping distance due to a failure in the primary valve set. In addition, instability between the two valve sets, for example, the two electro-hydraulic valve sets, is reduced. It should be noted that with the primary valve set supplied by the primary pump and the secondary valve set supplied by the backup pump and the primary pump, the secondary valve set is able to provide backup braking in the event of a failure in the primary valve set or in the primary supply source.

Other control schemes and logic are contemplated. For example, instead of $P_{secondary}=P_{primary}$, the control system in some implementations provides a closed loop control to tractor stopping distance, by increasing $P_{secondary}$ to a greater value than $P_{primary}$ in the event of a primary valve set failure. In some examples, the slope of the pressure increase as illustrated by the plots in FIGS. 18 and 19 can be varied or changed to adjust the timing of the actuation and de-actuation of the valves, including pressurizing times. That is, the sequencing or timing of the operation of the valves can be changed or adjusted as desired or needed.

Figure 21:
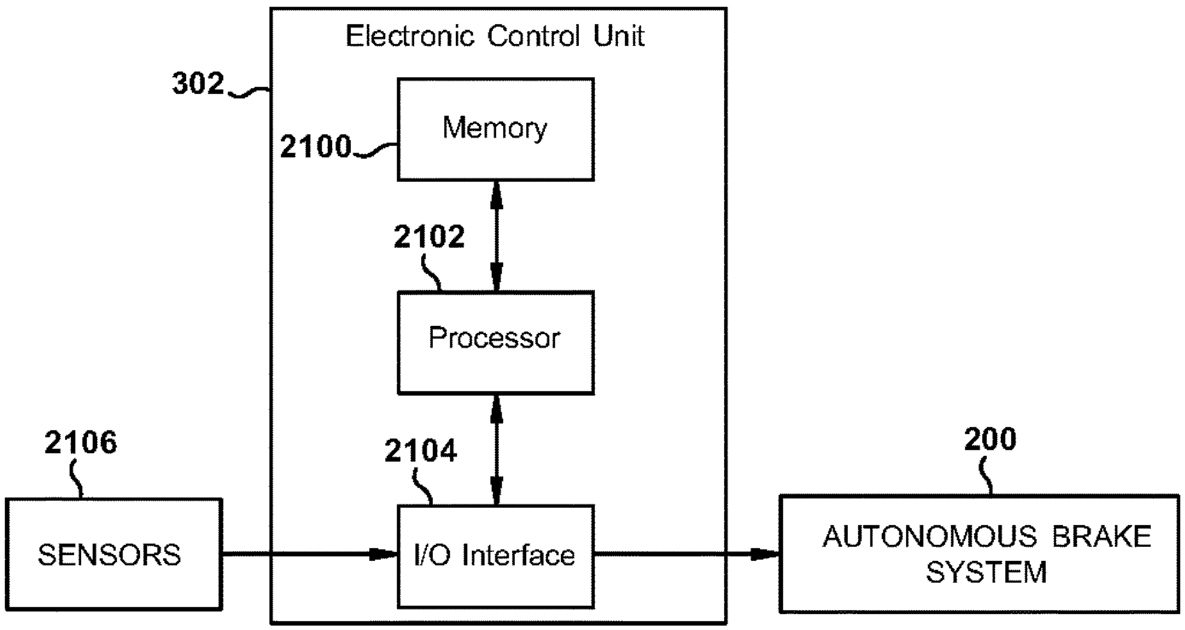
FIG. 21 is a block diagram of an electronic control unit usable with one or more implementations.

In one or more examples, the ECU 302 is configured to control various aspects of the operation of the autonomous brake system 200, such as the actuation of the various valves. FIG. 21 illustrates an example of the ECU 302 for controlling the autonomous brake system 200. The ECU 302 includes a plurality of electrical and electronic components that provide power, operational control, and protection to the components and modules within the ECU 302. In particular, the ECU 302 includes, among other things, an electronic processor 2102 (e.g., a programmable microprocessor, microcontroller, or similar device), non-transitory, machine-readable memory 2100, and an input/output interface 2104. The electronic processor 2102 is communicatively coupled to the memory 2100. The electronic processor 2102 is configured to retrieve from the memory 2100 and execute, among other things, instructions related to the control processes and methods described herein, such as to control braking by the autonomous brake system 200. In some examples, the ECU 302 includes additional, fewer, or different components. The ECU 302 may also be configured to communicate with external systems including, for example, other components of the vehicle 100 and/or operator controls.

The ECU 302 in the illustrated example is communicatively coupled to a plurality of sensors 2106, which may be embodied as or include one or more of the sensors 322, 324, 326, 328, 330, 332 (see FIG. 3) or other sensors (e.g., sensors 1314, 1316, 1320, 1322 as illustrated in FIG. 13-17). The ECU 302 in some examples receives a signal input from one or more of the sensors 2106 indicative of, for example, a pressure level and is configured to adjust and/or control one or more components (e.g., one or more valves) of the autonomous brake system 200. The input/output interface 2104 facilitates communication between the ECU 302 and the autonomous brake system 200. Through the input/output interface 2104, the ECU 302 is configured, for example, to control different settings of the autonomous brake system 200 to obtain a desired or required braking.

It should be noted that the memory 2100 in some examples includes any computer-readable media. In one example, the memory 2100 is used to store and access instructions configured to carry out the various operations disclosed herein. In some examples, the memory 2100 includes computer storage media in the form of volatile and/or nonvolatile memory, removable or non-removable memory, data disks in virtual environments, or a combination thereof. In one example, the processor(s) 2102 includes any quantity of processing units that read data from various entities, such as the memory 2100. Specifically, the processor(s) 2102 are programmed to execute computer-executable instructions for implementing aspects of the disclosure. In one example, the instructions are performed by the processor(s) 2102 and the processor 362 is programmed to execute instructions such as those to perform one or more operations discussed herein and depicted in the accompanying drawings.

It should also be noted that computer readable media comprises computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se.

While various spatial and directional terms, including but not limited to top, bottom, lower, mid, lateral, horizontal, vertical, front and the like are used to describe the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

Any range or value given herein can be extended or altered without losing the effect sought, as will be apparent to the skilled person.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A method for controlling autonomous braking, the method comprising:

receiving a command for application of a brake pressure;

controlling a primary valve set, via an electronic control unit (ECU), to a first defined pressure to apply a braking power in response to the received command;

controlling a secondary valve set, via the ECU, to a second defined pressure in response to the received command, wherein the second defined pressure is less than the first defined pressure; and controlling the secondary valve set, via the ECU, to the first defined pressure in response to a determination that the braking power applied by the primary valve set is below a low command threshold, wherein the low command threshold is less than the first defined pressure, wherein the primary valve set and the secondary valve set each comprises a control valve and an enable valve, and the primary valve set and the secondary valve set are independently controllable.

2. The method of claim 1, wherein the second valve set is controlled to the second defined pressure after a defined delay period from when the command is received.

3. The method of claim 1, further comprising de-actuating the primary valve set in response to a determination that the braking power applied by the primary valve set is below the low command threshold.

4. The method of claim 1, wherein the low command threshold is less than the first defined pressure and greater than the second defined pressure.

5. The method of claim 1, wherein controlling the primary valve set to the first defined pressure comprises applying a first pressure increase slope and controlling the secondary valve set to the second defined pressure comprises applying a second pressure increase slope.

6. The method of claim 5, wherein the first pressure increase slope and the second pressure increase slope have a same slope.

7. The method of claim 5, wherein the first pressure increase slope and the second pressure increase slope have a different slope.

8. The method of claim 1, wherein the first defined pressure and the second defined pressure have a pressure offset that is five bars or less.

9. The method of claim 1, further comprising controlling application of braking force to at least one brake via the primary valve set or secondary valve set with a shuttle valve positioned between the at least one brake and the primary valve set and the secondary valve set.

10. One or more computer storage media having computer-executable instructions for controlling autonomous braking that, upon execution by a processor, cause the processor to at least:

receive a command for application of a brake pressure;

control a primary valve set to a first defined pressure to apply a braking power in response to the received command;

control a secondary valve set to a second defined pressure in response to the received command, wherein the second defined pressure is less than the first defined pressure; and control the secondary valve set to the first defined pressure in response to a determination that the braking power applied by the primary valve set is below a low command threshold, wherein the low command threshold is less than the first defined pressure, wherein the primary valve set and the secondary valve set each comprises a control valve and an enable valve, and the primary valve set and the secondary valve set are independently controllable.

11. The one or more computer storage media of claim 10, wherein the second valve set is controlled to the second defined pressure after a defined delay period from when the command is received.

12. The one or more computer storage media of claim 10, wherein the computer-executable instructions further cause the processor to de-actuate the primary valve set in response to a determination that the braking power applied by the primary valve set is below the low command threshold.

13. The one or more computer storage media of claim 10, wherein the low command threshold is less than the first defined pressure and greater than the second defined pressure.

14. The one or more computer storage media of claim 10, wherein controlling the primary valve set to the first defined pressure comprises applying a first pressure increase slope and controlling the secondary valve set to the second defined pressure comprises applying a second pressure increase slope.

15. The one or more computer storage media of claim 14, wherein the first pressure increase slope and the second pressure increase slope have a same slope.

16. The one or more computer storage media of claim 14, wherein the first pressure increase slope and the second pressure increase slope have a different slope.

17. The one or more computer storage media of claim 10, wherein the first defined pressure and the second defined pressure have a pressure offset that is five bars or less.

18. A method for controlling autonomous braking, the method comprising:

configuring a primary valve set for normal braking operation;

configuring a secondary valve set for backup braking operation;

pre-staging the secondary valve set during normal braking operation;

actuating the pre-staged secondary valve set during a failure of the primary valve set; and increasing a pressure of the pre-staged secondary valve to a pressure for normal braking operation to be applied to one or more brakes in response to the failure of the primary valve set, wherein the primary valve set and the secondary valve set each comprises a control valve and an enable valve, wherein the primary valve set and the secondary valve set are independently controllable.

19. The method of claim 18, wherein pre-staging the secondary valve set during normal braking operation comprises partial pressurizing of the secondary valve set.

20. The method of claim 18, further comprising controlling application of braking force to the one or more brakes via the primary valve set or secondary valve set with a shuttle valve positioned between the one or more brakes and the primary and secondary valve sets.

* * * * *